United States Patent
Gibbons et al.

(10) Patent No.: US 6,900,271 B2
(45) Date of Patent: May 31, 2005

(54) HYBRID POLYMER MATERIALS FOR LIQUID CRYSTAL ALIGNMENT LAYERS

(75) Inventors: Wayne M. Gibbons, Bear, DE (US); Michael G. P. Reppy, Wilmington, DE (US); Patricia A. Rose, Wilmington, DE (US); Hanxing Zheng, Wilmington, DE (US)

(73) Assignee: Elsicon, Inc, Newark, DE (US)

( * ) Notice: Subject to any disclaimer, the term of this patent is extended or adjusted under 35 U.S.C. 154(b) by 0 days.

(21) Appl. No.: 10/174,132

(22) Filed: Jun. 17, 2002

(65) Prior Publication Data

US 2003/0232927 A1 Dec. 18, 2003

Related U.S. Application Data

(63) Continuation-in-part of application No. 10/160,819, filed on May 31, 2002, now abandoned.

(51) Int. Cl.$^7$ .......................... C08L 77/12; C08L 79/08
(52) U.S. Cl. ...................... 525/180; 525/181; 525/421; 525/422; 525/426; 525/436
(58) Field of Search ................................ 525/180, 181, 525/421, 422, 426, 436

(56) References Cited

U.S. PATENT DOCUMENTS

| | | | |
|---|---|---|---|
| 4,157,430 A | | 6/1979 | Hergenrother et al. |
| 4,451,402 A | * | 5/1984 | D'Alelio et al. ............ 548/461 |
| 4,539,342 A | | 9/1985 | Lee et al. |
| 4,778,859 A | | 10/1988 | Ai et al. |
| 5,773,559 A | | 6/1998 | Miyamoto et al. |
| 5,824,377 A | | 10/1998 | Pirwitz et al. |
| 5,858,274 A | | 1/1999 | Mishina et al. |
| 5,958,292 A | | 9/1999 | Gibbons et al. |
| 6,224,788 B1 | | 5/2001 | Ogawa et al. |
| 6,335,409 B1 | | 1/2002 | Herr et al. |
| 6,340,506 B1 | | 1/2002 | Buchecker et al. |

FOREIGN PATENT DOCUMENTS

| | | |
|---|---|---|
| EP | 1229066 | 8/2002 |
| WO | 0153384 | 7/2001 |
| WO | 0172871 | 10/2001 |

OTHER PUBLICATIONS

J.L. Hedrick, et al., *Nanoporous polyimides,* Advances in Polymer Science, vol. 141, 1–43, 1999.

J.L. Hedrick, et al., *Polyimide foams derived from a high Tg polyimide with grafted poly(alpha–methylstyrene)* Polymer, vol. 37, No. 33, 5229–5236, 1996.

Coessens, V., Pintauer, T., Matyjaszewski, K., *Functional Polymers by Atom Transfer Radical Polymerization,* Prog. Polym. Sci. 26, 337–377, 2001.

Hedrick, J.L., Hawker, C.J., Dipietro, R., Jerome, R., Charlier., Y., *The Use of Styrenic Copolymers to Generate Polyimide Nanofoams,* Polymer, vol. 36, No. 25, 4855–4866, 1995.

Kamigaito, M., Ando, T., Sawamoto, M., *Metal–Catalyzed Living Radical Polymerization,* Chem. Rev., 3689–3745, 2001.

Matyjaszewski, K., Nakagawa, Y., Gaynor, S., *Synthesis of Well–defined Azido and Amino End–functionalized Polystyrene by Atom Transfer Radical Polymerization.* Macromol. Rapid Commun. 18, 1057–1066, 1997.

* cited by examiner

*Primary Examiner*—Ana Woodward
(74) *Attorney, Agent, or Firm*—Huntley & Associates LLC

(57) ABSTRACT

The present invention provides novel hybrid polymer optical alignment layers for inducing alignment of a liquid crystal medium. Hybrid polymers of this invention comprise at least one component of a macromonomer or polymer within the class of polyimide, polyamic acids and esters thereof, and at least one additional component from the group consisting of an addition monomer, monomers and addition polymer that are covalently bonded with the first component to form a copolymer. The invention further describes liquid crystal displays comprising the novel branched hybrid polymer optical alignment layers.

21 Claims, 1 Drawing Sheet

HYBRID POLYMER MATERIALS FOR LIQUID CRYSTAL ALIGNMENT LAYERS

CROSS-REFERENCE TO RELATED APPLICATION

This application is a Continuation-in-Part of application Ser. No. 10/160,819 filed May 31, 2002 now abandoned.

BACKGROUND OF THE INVENTION

The present invention relates to material for aligning liquid crystals, and liquid crystal optical elements.

Current liquid crystal display (LCD) elements include a product that utilize a twisted nematic mode, i.e., having a structure wherein the aligning direction of nematic liquid crystal molecules is twisted by 90° between a pair of upper and lower electrode substrates, a product utilizing a supertwisted nematic mode, utilizing a birefringent effect, i.e. having a structure wherein the aligning direction of nematic liquid crystal molecules is twisted by 180° to 300°, an in-plane-switching mode wherein both electrodes controlling the liquid crystal alignment are present on one substrate and the direction of the liquid crystal orientation in the plane of the substrate changes upon application of an electric field, and a product utilizing a ferroelectric liquid crystal substance or an antiferroelectric liquid crystal substance. Common to each of these products is a liquid crystal layer disposed between a pair of substrates coated with a polymeric alignment layer. The polymeric alignment layer controls the direction of alignment of the liquid crystal medium in the absence of an electric field. Usually the direction of alignment of the liquid crystal medium is established in a mechanical buffing process wherein the polymer layer is buffed with a cloth or other fibrous material. The liquid crystal medium contacting the buffed surface typically aligns parallel to the mechanical buffing direction. Alternatively, an alignment layer comprising anisotropically absorbing molecules can be exposed to polarized light to align a liquid crystal medium as disclosed in U.S. Pat. Nos. 5,032,009 and 4,974,941 "Process of Aligning and Realigning Liquid Crystal Media".

The process for aligning liquid crystal media with polarized light can be a noncontact method of alignment that has the potential to reduce dust and static charge buildup on alignment layers. Other advantages of the optical alignment process include high resolution control of alignment direction and high quality of alignment.

Requirements of optical alignment layers for liquid crystal displays include low energy threshold for alignment, transparency to visible light (no color), good dielectric properties and voltage holding ratios, long-term thermal and optical stability, and in many applications a controlled uniform pre-tilt angle.

Polymers used in forming optical alignment layers also must have a reasonably broad processing window. Polymers used as alignment layer in commercial liquid crystal displays are generally polyimide-based systems because of their good thermal and electrical properties.

One disadvantage to using polyimides in forming optical alignment layers is that they generally require high doses of polarized light (5–30 $J/cm^2$) to induce high quality optical alignment, as disclosed in U.S. Pat. No. 5,958,292. Disadvantages for requiring high doses of polarized light include low throughput in an assembly line due to increased residence time for the substrate in the exposure system, potential damage to the transistors and color filters needed in modern display systems and photodegradation of the alignment layer itself that may impair the long-term stability and performance of the device.

Photoactive polymers other than polyimides (such as polymethacrylates and polysiloxanes) that provide satisfactory quality alignment with low doses of polarized light (0.05–5 $J/cm^2$) have been described in U.S. Pat. No. 6,224,788, "Liquid Crystal Aligning Agent and Process for Producing Liquid Crystal Alignment Film Using the Same" and U.S. Pat. No. 5,824,377 "Photosensitive Material for Orientation of Liquid Crystal Device and Liquid Crystal Device Thereof". When irradiated with polarized light, these materials undergo photo-crosslinking to produce optical alignment layers. Advantages of these polymers include higher mobility of the polymer backbone leading to more efficient photo-crosslinking reactions and higher densities of photoreactive species due to the smaller repeat unit for the polymer. The high density and high mobility of photoreactive groups leads to the requirement of lower doses of polarized light for good alignment. However, the listed physical features that provide advantages in the optical density thresholds can provide for reduced electrical performance and optical stability of devices. In, for example, a thin film transistor TN display, this can result in an inadequate voltage holding ratio (VHR, a measure of the voltage drop in the display after the voltage has been switched off).

An approach to incorporating multiple desired properties (such as improving VHR) of materials for optical alignment layers is described in WO 99/49360 "Liquid Crystal Orientation Layer" and WO 01/72871 A1 "Polymer Blend for Preparing Liquid Crystal Alignment Layer." Blends of polymeric compounds containing photoreactive polymers (typically non-polyimide) and polyimides are proposed as a method to improve the inadequate VHR of the non-polyimide by blending with material having high VHR (typically a polyimide). The blends have the disadvantage of limited miscibility and, thus, limit the quantity of photoreactive material available for alignment.

An approach to incorporating multiple desired properties into a polyimide for conventional liquid crystal alignment layers has been described in U.S. Pat. No. 5,773,559 "Polyimide Block Copolymer and Liquid Crystal Alignment Layer Forming Agent". In this process, polyimide block copolymers, wherein a polyimide-type block is copolymerized with a different polyimide-type block, are described which provide multiple properties that are difficult to obtain by conventional polyimide synthesis.

Copolymerization of related monomers is well known in the art. Less well known is the copolymerization of unrelated monomers or polymers to form copolymers, particularly between polyimide-type polymers and addition-type polymers. Curable compositions of polyimides containing reactive double-bonds combined with crosslinking reagents such as tetraethylene glycol diacrylate for use in electronic or optical components have been described in, for example, U.S. Pat. No. 4,778,859. These materials form a cross-linked matrix during cure conditions, however the architecture of the matrix that is formed is not known and cannot be controlled. Hedrick et al (*Polymer*, Vol 36, No 25, 4855–4866, 1995) describes the synthesis of triblock copolymers wherein the polyimide block is terminated by polystyrene oligomers, a thermally unstable polymer. These materials are specifically designed to undergo microphase separation. Upon heating, the thermally unstable polystyrene blocks decompose, leaving nanometer size pores in the structure. U.S. Pat. No. 4,539,342 "Polyimide Foam Prepared from Amino Terminated Butadiene Acrylonitrile Reactant" describes a polyimide foam wherein one of the components is an amine-terminated butadiene-acrylonitrile copolymer. The described materials are known in the art as segmented block copolymers and provide foams that are flexible and resilient and provide high vapor-barrier characteristics. Similarly, U.S. Pat. No. 4,157,430 "Amine Terminated Polymers and the Formation of Block Copolymers" describes the synthesis of amine terminated butadiene polymers for the formation of block copolymers as thermoset rigid foams. The authors describe, but do not teach, the concept of copolymers with polyimides. However, microphase separation and polyimide foam characteristics, common features to the aforementioned papers and patents, are not desirable properties for materials for liquid crystal alignment layers.

In further developing materials and processes for optical alignment layers, we have invented a new and novel copolymer comprising units from addition polymers and polyimides, which is described herein. These new materials and processes for optical alignment layers were invented to remove or reduce the disadvantages of optical alignment layers described previously. We refer to this new class of polymers as hybrid polymers. These hybrid polymers have at least one component comprising a macromonomer or polymer within the class of polyimides, polyamic acids and esters thereof and a second component comprising an addition monomer or monomers or functionalized addition polymer or polymers that are covalently bonded with the first component to form a copolymer. This novel class of new, hybrid polymers combines the good thermal and electrical properties of polyimides with the high density and high mobility advantages of addition polymers such as polymethacrylates, polyacrylates, polyolefins and polystyrenes. In this way, multiple desirable properties that are difficult to obtain by other materials and processes can be achieved.

SUMMARY OF INVENTION

The present invention describes the composition of a hybrid polymer which is useful, especially as a liquid crystal optical alignment layer, and provides a plurality of desirable properties. Hybrid polymers of this invention comprise at least one component of a macromonomer or polymer within the class of polyimide, polyamic acids and esters thereof, and at least one additional component from the group comprising an addition monomer, monomers and addition polymer that are covalently bonded with the first component to form a copolymer. Another embodiment of the invention includes hybrid polymers comprising at least one component of a macromonomer or polymer within the class of polyimide, polyamic acids and esters thereof, and at least one additional component from the group comprising an addition monomer, monomers and addition polymer that are covalently bonded to the first component to form a branched copolymer.

The invention further embodies optical alignment layers prepared from the hybrid polymers and liquid crystal display elements incorporating the optical alignment layers.

DETAILED DESCRIPTION OF THE INVENTION

Figure 1:
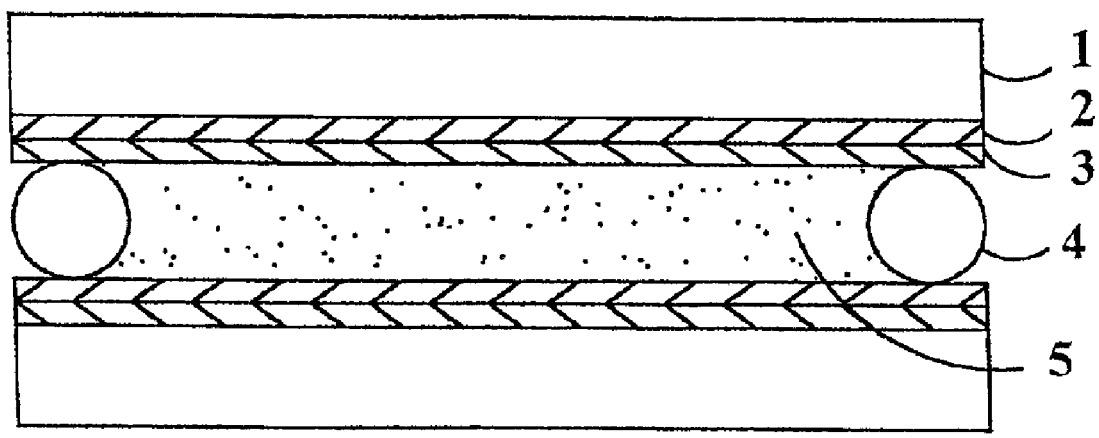
FIG. 1 is a cross-sectional view of a liquid crystal display element.

As used herein, the term "alignment layer" is the layer of material on the surface of a substrate that controls the alignment of a liquid crystal layer in the absence of an external field. A "conventional alignment layer" herein refers to an alignment layer that will only align a liquid crystal layer via processing other than optical means. For example, mechanically buffed polyimides, evaporated silicon dioxide, Langmuir-Blodgett films, have all been shown to align liquid crystals.

"Optical alignment layer" herein refers to an alignment layer that contains anisotropically absorbing molecules that will induce alignment of liquid crystals after exposure with polarized light. The optical alignment layer can be an isotropic medium or have some degree of anisotropy before optical alignment. "Activated polyimides" of the invention are herein referred to as polyimides, polyamic acids and esters thereof prepared by use of specifically functionalized diamines, dianhydrides, monoamines or monoanhydrides and/or by the stoichiometric mismatch of diamines and dianhydrides and/or by chemical modification of the polyimide, polyamic acid or ester thereof to incorporate polymerizable functional groups. The term "Activated" is not meant to restrict the polyimides to a specific mode of action. Rather, the term is meant to suggest to the artisan how the polymers may perform their function. The invention is not restricted to a specific mechanism of action in order to synthesize the desired hybrid polymer.

"Addition monomers" are herein defined as monomer units with a monoreactive group used in the polymerization of addition polymers or copolymers. A "functionalized addition polymer" of the invention is herein referred to as an addition oligomer, copolymer or polymer that contains one or more functionalized end-groups or side chains. These functionalized moieties may include, but are not limited to, amines, diamines, anhydrides, dianhydrides, isocyanates and acid chlorides.

"Addition polymerization moiety" or "Addition polymerization moieties" are one or more reactive groups covalently bonded to the activated polyimides that can undergo addition polymerization with an addition monomer or monomers or functionalized addition polymer or polymers.

A "branched copolymer" of the invention is herein referred to as a copolymer where the backbone contains one or more branch points.

A "hybrid polymer" of the invention is herein referred to as a copolymer having at least one component comprising a macromonomer or polymer within the class of polyimides, polyamic acids and esters thereof and at least one additional component from the group comprising an addition monomer, monomers and addition polymer that are covalently bonded with the first component to form a copolymer.

A "branched hybrid polymer" is a hybrid polymer where the backbone contains one or more branch points.

Optical alignment layers are alignment layers that contain anisotropically absorbing molecules that will induce alignment of liquid crystals after exposure with polarized light. Optical alignment layers of the invention may be processed by conventional means, such as mechanical rubbing, prior to or after exposure to polarized light. The anisotropically absorbing molecules of the optical alignment layers exhibit absorption properties with different values when measured along axes in different directions. The anisotropic absorbing molecules exhibit absorption bands between 150 nm and about 2000 nm. Most preferable optical alignment layers for the present invention have absorbance maxima of about from 150 to 400 nm and especially about from 250 to 400 nm.

Polymers especially useful and preferred as optical alignment layers are polyimides. Polyimides are known for their excellent thermal and electrical stability properties and these properties are useful in optical alignment layers for liquid crystal displays. The preparation of polyimides is described in "Polyimides", D. Wilson, H. D. Stenzenberger, and P. M. Hergenrother Eds., Chapman and Hall, New York (1990). Typically polyimides are prepared by the condensation of one equivalent of a diamine with one equivalent of a dianhydride in a polar solvent to give a poly(amic acid) prepolymer intermediate. Copolymer polyimides are materials prepared by the condensation of one or more diamines with one or more dianhydrides to give a copolyamic acid.

An alternative intermediate to polyimides are poly(amic esters) that can be made by esterification of poly(amic acids) with alcohols. The poly(amic esters) undergo thermal imidization to form polyimides.

Thus, poly(amic acids) and poly(amic esters) are considered to be very closely related precursors to polyimides of the invention. Therefore, they are considered further embodiments of this invention. Furthermore, preimidized polyimides derived from chemical or thermal imidization of poly(amide acids) or poly(amide esters) are also considered an embodiment of the invention. The novel polymers of the invention are hybrid polymers that comprise 5–95% or more preferably 25–75% of polymer within the class of polyimides, poly(amic acids) and esters thereof.

Activated polyimides required for the invention are polyimides, polyamic acids and esters thereof prepared by use of specifically functionalized diamines, dianhydrides, monoamines or monoanhydrides and/or by the stoichiometric mismatch of diamines and dianhydrides and/or by chemical modification of the polyimide, polyamic acid or ester thereof to incorporate polymerizable functional groups. A typical polyimide contains an equal number of anhydride and amine endgroup functionalities in the poly(amic acid) prepolymer. Polyimides prepared with stoichiometric mismatch will produce polymer chains that are terminated by the functionality in excess. For example, a 1.1 to 1.0 ratio of diamine to dianhydride will result in the majority of polymer chains having both ends terminating in amines. Similar results are obtained when monofunctional units (for example a monoamine or monoanhydride) are added to the monomer mix. The resultant polyimide will have all chains terminated by the monofunctional units.

A wide variety of dianhydrides may be used in forming the activated polyimide. Specific examples of tetracarboxylic dianhydride components include aromatic dianhydrides such as 3,3',4,4'-benzophenonetetracarboxylic dianhydride, pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 3,3'4,4'-biphenyltetracarboxylic dianhydride, 2,3,2',3'-biphenyltetracarboxylic dianhydride, bis(3,4-dicarboxyphenyl)ether dianhydride, bis(3,4-dicarboxyphenyl)diphenylsulfone dianhydride, bis(3,4-dicarboxyphenyl)methane dianhydride, 2,2-bis(3,4-dicarboxyphenyl)propane dianhydride, 1,1,1,3,3,3-hexafluoro-2,2-bis(3,4-dicarboxyphenyl)propane dianhydride, bis(3,4-dicarboxyphenyl)dimethylsilane dianhydride, 2,3,4,5-pyridinetetracarboxylic dianhydride; alicyclic tetracarboxylic dianhydrides such as 1,2,3,4-butanetetracarboxylic dianhydride, 1,2,3,4-cyclobutanetetracarboxylic dianhydride, 1,2,3,4-cyclopentanetetracarboxylic dianhydride, 1,2,4,5-cyclohexanetetracarboxylic dianhydride, 2,3,5-tricarboxycyclopentylacetic acid dianhydride and 3,4-dicarboxy-1,2,3,4-tetrahydro-1-naphthalenesuccinic dianhydride; and their acid and acid chloride derivatives. Preferred dianhydrides are 1,2,3,4-cyclobutanetetracarboxylic dianhydride, and 1,2,3,4-cyclopentanetetracarboxylic dianhydride. The most preferred dianhydride is 1,2,3,4-cyclobutanetetracarboxylic dianhydride.

Examples of monoanhydrides that may be used in preparing the activated polyimide include maleic anhydride, dimethylmaleic anhydride, methyl-5-norbornene-2,3-dicarboxylic anhydride and endo-norbornenedicarboxylic anhydride.

A variety of diamines may be useful in the preparation of novel hybrid polymers of the invention including aromatic diamines such as 2,5-diaminobenzonitrile, 2-(trifluoromethyl)-1,4-benzenediamine, p-phenylenediamine, 2-chloro-1,4-benzenediamine, 2-fluoro-1,4-benzenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl)methane, diaminodiphenylsulfone, diaminonaphthalene, 1,4-bis(4-aminophenoxy)benzene, 4,4'-diaminobenzophenone, 3,4'-diaminobenzophenone, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane, 2,4,6-trimethyl-1,3-phenylenediamine and 2,2-bis[4-(4-aminophenoxy)phenyl]hexafluoropropane; alicyclic diamines such as bis(4-aminocyclohexyl)methane; and aliphatic diamines such as tetramethylenediamine and hexamethylene diamine. Further, diaminosiloxanes such as bis(3-aminopropyl)tetramethyldisiloxane may be used. Such diamines may be used alone or in combination as a mixture of two or more of them. Preferred diamines for preparing copolyimides are bis(4-aminocyclohexyl)methane, 2-(N,N-diallylamino)1,4-benzenediamine, 1-(N,N-diallylamino)-2,4-benzenediamine, 1-[4-vinylphenoxy]-2,5-benzenediamine, 1-[4-vinylphenoxy]-2,4-benzenediamine and 2,4,6-trimethyl-1,3-phenylenediamine.

Most preferred diamines that may be used in preparing the activated polyimide are shown in Table 1.

TABLE 1

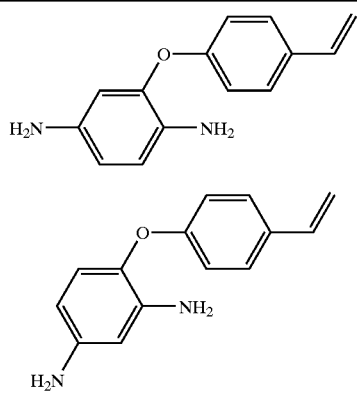

TABLE 1-continued

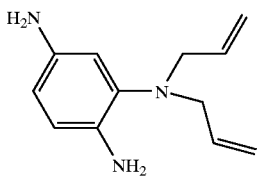

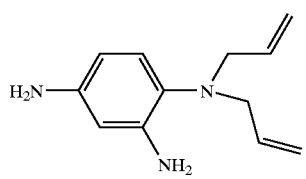

Preferred monoamines that may be used in preparing the activated polyimide include 3-vinyl aniline, 4-vinyl aniline and allyl amine. The most preferred monoamine is 4-vinyl aniline.

The novel polymers of the invention are hybrid polymers that also comprise 5–95% or more preferably 25–75% of polymer within the class of addition polymers, including, but not limited to, polymethacrylates, polyacrylates, polystyrenes, polynorbornenes, polyolefins, and polyacrylamides. The addition polymer component of the hybrid polymer can impart desired properties to the polyimide component, such as stable pretilt and good optical alignment at low levels of irradiation.

Preferred addition polymer components of the invention for improved optical alignment qualities of liquid crystal displays are those containing photoreactive groups capable of dimerization upon optical alignment. These photoreactive groups include, but are not limited to, 3-arylacrylic esters (cinnamates), chalcones and coumarin structures, as shown in Table 2. Examples of addition polymer components that are useful for the invention are those described for addition polymer products in the following publications: U.S. Pat. No. 6,335,409 B1 (cinnamates), U.S. Pat. No. 6,224,788 (chalcones) and Jackson et al in *Chem. Mater.* (2001) 13, p 694–703 (coumarins).

TABLE 2

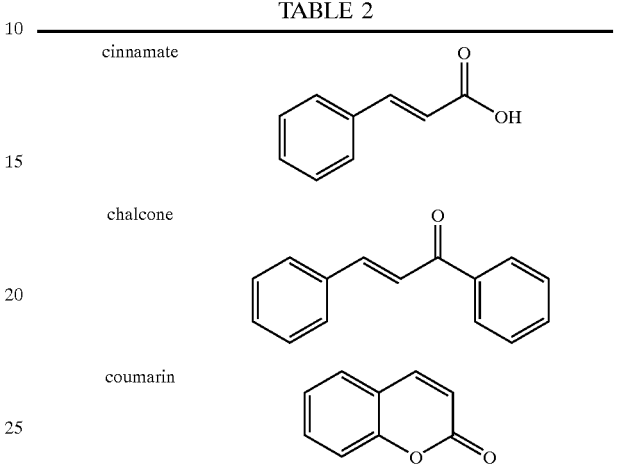

Most preferred addition polymer components are made from addition monomers shown in Table 3. When irradiated with polarized light, these materials undergo photo-crosslinking to produce optical alignment layers. In some instances uncrosslinked and crosslinked addition monomers can establish pretilt in liquid crystal molecules in contact with the optical alignment layer comprising said addition monomers.

TABLE 3

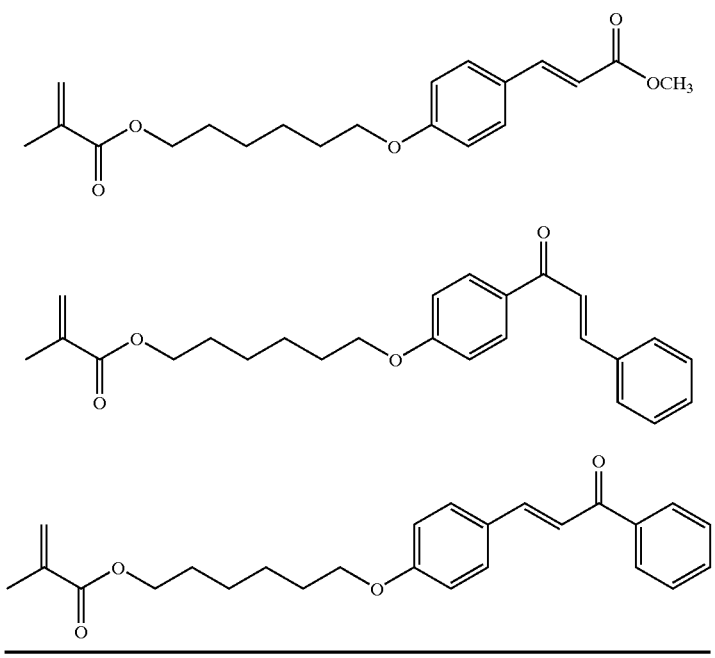

Most liquid crystal devices, including displays, have a finite pre-tilt angle, controlled, for instance, by the mechanical buffing of selected polymeric alignment layers. The liquid crystal molecule in contact with such a layer aligns parallel to the buffing direction, but is not exactly parallel to the substrate. The liquid crystal molecules are slightly tilted from the substrate, for instance by about 2–15 degrees. For optimum performance in most display applications a finite and uniform pre-tilt angle of the liquid crystal is desirable. Several approaches have been explored to add pre-tilt to, optical alignment layers for liquid crystal displays. One approach is the incorporation of long alkyl chains as side-groups in polyimide alignment layers, as described in U.S. Pat. No. 5,858,274. A second approach, described in U.S. Pat. No. 5,731,405, are polyimide optical alignment layers having C4–C20 fluorinated or partially fluorinated alkyl chains as side-groups. Preferred addition polymer components of the invention that produce optical alignment layers with a defined angle of pre-tilt contain a C4–C24 alkyl chain (branched or linear) or a C4–C20 fluorinated or partially fluorinated alkyl chain. Most preferred addition polymer components of the invention that produce optical alignment layers with a defined angle of pre-tilt contain a photoreactive group capable of dimerizing upon optical alignment and also contain a C4–C24 alkyl chain (branched or linear) or a C4–C20 fluorinated or partially fluorinated alkyl chain. Table 4 shows two examples of addition monomers that can be used for this purpose. One who is skilled in the art will realize that there is a great variety of addition monomers that can impart these and other properties that will be useful to the invention.

approaches to synthesizing the hybrid polymers and are not meant to limit the scope of the invention. The materials of the invention can be synthesized by several methods of synthesis detailed herein:

Method 1:

An activated polyimide, as described by the general formulas 1 and 2, is prepared having both ends of the polymer functionalized with an addition polymerization moiety, for example by incorporation of either monofunctional amines or anhydrides that contain addition polymerization moieties, or by post processing of poly(amic acid) prepolymer. Preferred end group functionalization moieties of the invention include but are not limited to methacrylates and derivatives; acrylates and derivatives; methacrylamides and derivatives; acrylamides and derivatives; allyl groups and derivatives, vinyl groups and derivatives, styrenes and derivatives, maleimides or maleic anhydrides and derivatives and norbornenes and derivatives. Most preferred end-group functionalization moieties are acrylamides and methacrylamides, which can be prepared by post modification of an off-stoichiometry poly(amic acid) containing amino end groups, and styrene groups, which can be prepared by synthesizing the poly(amic acid) with 4-vinylaniline as a monoamine end-capper.

The activated polyimides 1 and/or 2 are then copolymerized in an addition fashion with the addition monomer 3 to yield hybrid polymers. The preferred polymerization moiety of the addition monomers or co-monomers of the invention independently include, but are not limited to: methacrylates and derivatives; acrylates and derivatives; methacrylamides

TABLE 4

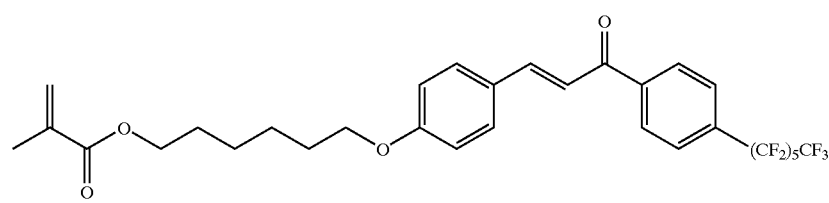

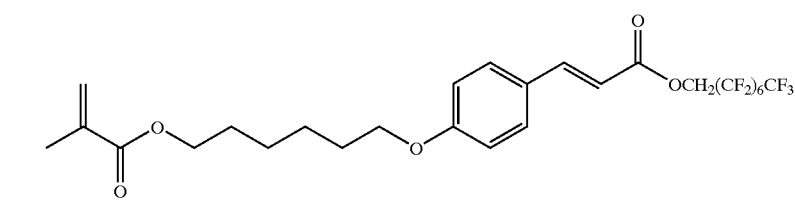

The novel polymers of this invention can be synthesized by several methods, each leading to a unique hybrid polymer architecture between a polyimide and an addition monomer or polymer. These differ in the manner and order of synthesis and can independently provide useful materials of similar overall composition but different detailed molecular architecture. These methods are meant to exemplify various and derivatives; acrylamides and derivatives; allyl groups and derivatives, vinyl groups and derivatives, styrenes and derivatives, maleimides or maleic anhydrides and derivatives and norbornenes and derivatives. Most preferred polymerization moieties of the addition monomers of the invention include methacrylates and derivatives and acrylates and derivatives.

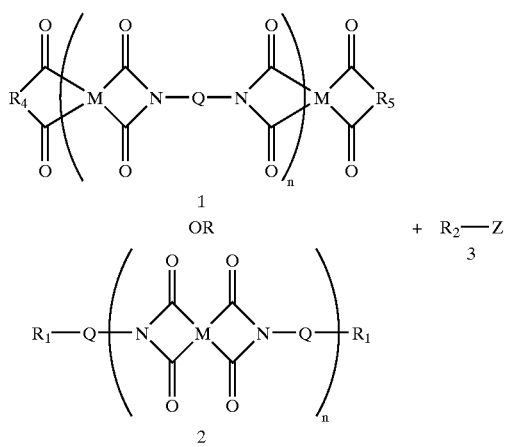

Where M is a tetravalent organic group, Q is a divalent organic group optionally substituted with fluorine, chlorine, cyano, alkyl, fluoroalkyl, alkoxy, alkylamino or diallylamino, $R_1$ and $R_5$ are each a mono or divalent organic group, $R_1$ and $R_2$ are each a monovalent organic group, each of which comprises a polymerization moiety, wherein $R_4$, $R_5$, $R_1$ and $R_2$ are at least one organic group independently selected from the group consisting of methacrylates and derivatives; acrylates and derivatives; methacrylamides and derivatives; acrylamides and derivatives; allyl groups and derivatives, vinyl groups and derivatives, styrenes and derivatives, maleimides or maleic anhydrides and derivatives and norbornenes and derivatives and Z is a monovalent organic group and n is 3–5000. $R_1$, $R_2$, $R_4$, $R_5$, M, Q and Z can each independently represent a single chemical structure or a collection of distinct chemical structures.

One skilled in the art will realize that by controlling the conditions of the second polymerization to avoid complete cross-linking of the difunctionalized polyimide, soluble polymers can be obtained and uniform thin films for liquid crystal alignment can be prepared. The polymer architecture formed is a branched copolymer, where the addition monomer units and the reactive endgroups of the polyimide combine to form a linear polymer with a backbone structure of the addition polymer portion and the polyimide segments will form internal crosslinks between linear addition polymer chains or dangling branches off the side of linear polymer chains. The branched copolymer has advantages that prove useful for the invention. They provide higher molecular weight with crosslinking which decreases mobility and improves thermal stability. Furthermore, the copolymers are more likely to be miscible with each other resulting in better polymer film forming properties and thermal stability. Despite these advantages, it should be noted that a branched hybrid polymer is one embodiment of the invention. The branching of the copolymer is not a requirement of the invention as is further exemplified in the descriptions of Methods 3–5.

Method 2:

An activated polyimide or copolymer polyimide is prepared incorporating addition polymerization moieties in the side chains of either the diamine or dianhydride monomers, as shown in the general formula 4. Preferred activated polyimides of the invention have sidechains from either diamines or dianhydrides containing allyl groups and derivatives, vinyl groups and derivatives, styrenes and derivatives, maleimides or maleic anhydrides and derivatives and norbornenes and derivatives. Most preferred activated polyimides of the invention are prepared using one or more diamines shown in Table 1. Preferably the novel activated polyimides and copolyimides of the invention contain 5–100 mol % monomers incorporating addition polymerization moieties in the sidechain, and more preferably 5–50 mol %.

The polyimide portion is subsequently copolymerized with the addition monomer 5 in a second polymerization to yield hybrid polymers. The preferred polymerization moiety of the addition monomers or co-monomers of the invention independently include, but are not limited to: methacrylates and derivatives; acrylates and derivatives; methacrylamides and derivatives; acrylamides and derivatives; allyl groups and derivatives, vinyl groups and derivatives, styrenes and derivatives, maleimides or maleic anhydrides and derivatives and norbornenes and derivatives. Most preferred polymerization moieties of the addition monomers of the invention include methacrylates and derivatives and acrylates and derivatives.

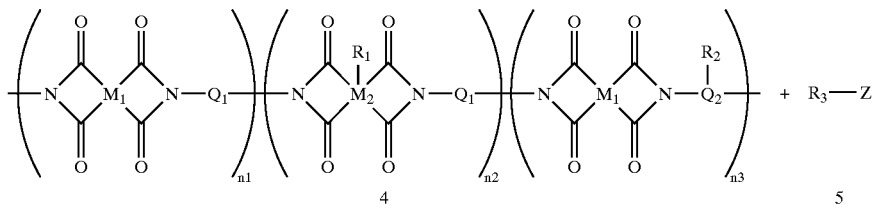

Where $M_1$ is a tetravalent organic group, $M_2$ is a pentavalent organic group, $Q_1$ is a divalent organic group optionally substituted with fluorine, chlorine, cyano, alkyl, fluoroalkyl, alkoxy, alkylamino or diallylamino, $Q_2$ is a trivalent organic group optionally substituted with fluorine, chlorine, cyano, alkyl, fluoroalkyl, alkoxy, alkylamino or diallylamino, $R_1$, $R_2$ and $R_3$ are each a monovalent organic group which comprises a polymerization moiety, wherein $R_1$, $R_2$ and $R_3$ are at least one organic group independently selected from the group consisting of methacrylates and derivatives; acrylates and derivatives; methacrylamides and derivatives; acrylamides and derivatives; allyl groups and derivatives, vinyl groups and derivatives, styrenes and derivatives, maleimides or maleic anhydrides and derivatives and norbornenes and derivatives and Z is a monovalent organic group. n1 is 0–5000, n2 is 0–5000, n3 is from 0–5000 and n2+n3>0 and n1+n2+n3=3–5000. $R_1$, $R_2$, $R_3$, M1, M2, Q1, Q2 and Z can each independently represent a single chemical structure or a collection of distinct chemical structures.

The polymer architecture formed will be a branched copolymer, similar to Method 1 and, thus, should show similar advantages to polymer formed by Method 1. A noticeable difference between the architecture of Method 2 hybrid polymers and Method 1 hybrid polymers is that the connection between the linear addition polymer segments and the polyimide segments will occur on the side of the polyimide (in Method 2) rather than the end of the polyimide (Method 1).

Method 3:

A functionalized addition polymer that is terminated with a monoamine or monoanhydride is prepared and then copolymerized with diamine and dianhydride monomers for the synthesis of hybrid polymers, as shown in the general formula below. The structure of the copolymer of this mode is known in the art as an ABA triblock copolymer, with the "A" portion representing the addition-polymer portions, which form the end sections of the polymer chains and the "B" portion represents the polyimide portion, which form the middle section of each polymer chain. One method for synthesizing amine-terminated polymethacrylates is disclosed in Haddleton et. al. *Macromolecules*, 1999, vol 32, 8732–8739. A polyimide synthesis utilizing an addition polymer derived oligo/polymeric monoamine is also disclosed in Hedrick et al, *Polymer*, 1995, vol 36, no 25, 4855–4866. These materials were developed specifically for microphase separation, an undesirable property for hybrid polymers of the invention. One skilled in the art would realize that by controlling the size and properties of the polymer blocks one could develop useful materials for the invention. An alternative method for achieving this polymer architecture is to first prepare end-functionalized polyimide with an initiator moiety suitable for subsequent use in the living radical polymerization (vs a random polymerization) of addition copolymers. A general review on the theory of living radical polymerization is given in Kamigaito et al, *Chemical Reviews*, 2001, 101 3689–3745. The addition polymer can then be grown off the ends of the polyimide from the initiation moiety.

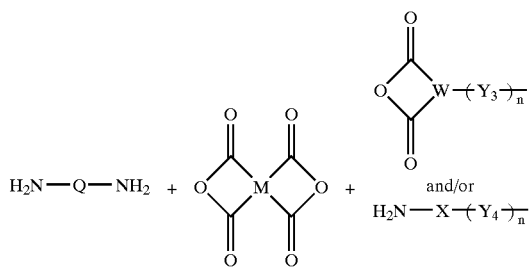

Where M is a tetravalent organic group, Q is a divalent organic group optionally substituted with fluorine, chlorine, cyano, alkyl, fluoroalkyl, alkoxy, alkylamino or diallylamino. W is a trivalent organic group, X is a divalent organic group and $Y_3$ and $Y_4$ are each a divaleut organic group representing the repeat unit of an addition polymer, and n is from 2–5000. M, W, X, Q, $Y_3$ and $Y_4$ can each independently represent a single chemical structure or a collection of distinct chemical structures.

Method 4:

An addition oligomer, polymer or copolymer that has one or more amine or anhydride functional groups is prepared. The functionalized oligomers can then be copolymerized with diamine and dianhydride monomers for the synthesis of hybrid polymers, as shown in the general formula below.

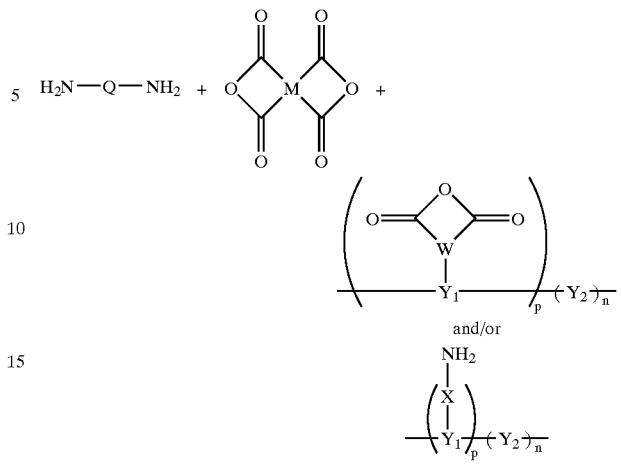

Where M is a tetravalent organic group, Q is a divalent organic group optionally substituted with fluorine, chlorine, cyano, alkyl, fluoroalkyl, alkoxy, alkylamino or diallylamino. W is a trivalent organic group, X is a divalent organic group. $Y_1$ is a trivalent organic group representing the repeat unit of an addition polymer, $Y_2$ is a divalent organic group representing the repeat unit of an addition polymer, n is from 2–5000, and p is from 1–1000. M, W, X, Q, $Y_1$ and $Y_2$ can each independently represent a single chemical structure or a collection of distinct chemical structures.

In one embodiment of this method, using a bis-end-functionalized oligomer, the hybrid polymer is referred to as a "segmented hybrid polymer", ABABABAB, where the "A" units represents segments of the addition polymer units and the "B" units represent polyimide segments. The synthesis of an addition polymer of styrene that is bis-end-functionalized is described in Matyjaszewski et al, *Macromol. Rapid Commun.* 1997, vol 18, 1057–1066. The synthesis of amine or anhydride bis-end-functionalized polymers, as would be useful for the synthesis of hybrid polymers of the invention, are not specifically described herein, however, one skilled in the art will realize that there are a variety of methods available for such chemical transformations. U.S. Pat. No. 4,539,342 describes the preparation of polyimide foams wherein diamines and dianhydrides or their equivalents are reacted with amine-terminated butadiene-nitrile copolymer, an example of an amine bis-end functionalized polymer. One who is skilled in the art will realize that by judicious choice of addition monomers and by controlling the size of the functionalized polymer, one can avoid undesirable properties in the hybrid polymers of the invention, such as polyimide foam formation described for the amine-terminated butadiene-nitrile copolymer in U.S. Pat. No. 4,539,342.

Method 5:

An addition oligomer, polymer or copolymer that is terminated with a diamine or dianhydride is prepared. Preparation of such a material can be carried out by using appropriately functionalized initiator or endgroup termination reactions using the general procedures outlined in Coessens et al, *Progress in Polymer Science*, 2001, vol 26, 337–377. The diamine (or dianhydride) can then be copolymerized with diamine and dianhydride monomers for the synthesis of hybrid polymers. The hybrid polymer of this mode is termed a "comb hybrid polymer" where the backbone of the "comb" is the polyimide and the "tines" of the comb are the addition polymer segments.

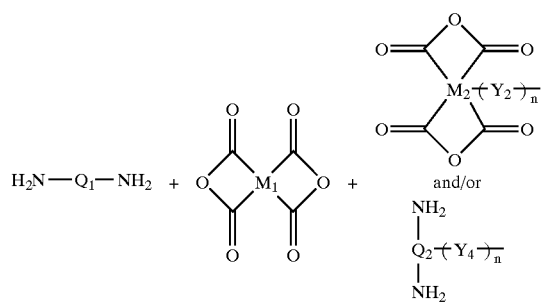

Where $M_1$ is a tetravalent organic group, $M_2$ is a pentavalent organic group, $Q_1$ is a divalent organic group optionally substituted with fluorine, chlorine, cyano, alkyl, fluoroalkyl, alkoxy, alkylamino or diallylamino and $Q_2$ is a trivalent organic group optionally substituted with fluorine, chlorine, cyano, alkyl, fluoroalkyl, alkoxy, alkylamino or diallylamino. $Y_3$ and $Y_4$ are each a divalent organic group representing the repeat unit of an addition polymer and n is from 2–5000. $M_1$, $M_2$, $Q_1$, $Q_2$, $Y_3$ and $Y_4$ can each independently represent a single chemical structure or a collection of distinct chemical structures.

An alternative method for preparing the "comb hybrid polymer" of Method 5 is to first prepare a diamine (or dianhydride) containing an initiator moiety suitable for subsequent use in a living radical polymerization (vs a random polymerization) of addition copolymers. The diamine (or dianhydride) is then incorporated into a polyimide using a chosen mixture of diamines and dianhydrides selected for desired properties and molecular weight. The addition polymer can then be grown off the sidechain(s) of the polyimide from the initiation moiety. The preparation of a variety of comb copolymers using this method is described in Matyjaszewski et al., *Chemical Reviews*, 2001, vol 101, 2921–2990. The preparation of comb copolymers incorporating polyimides, an embodiment of this invention, has not been described in Matyjaszewski et al or elsewhere in the literature.

To prepare the optical alignment layers the hybrid polymer solutions are coated onto desired substrates. Usually, for testing purposes, the substrates have a patterned indium-tin-oxide transparent electrode. Coating is usually accomplished with 1 to 30 wt % solids. Any conventional method may be used to coat the substrates including brushing, spraying, spin-casting, meniscus coating, dipping or printing. The preferred techniques for coating substrates demonstrated in the Examples are spinning and printing. However, the optical alignment materials of the invention are not limited to use in printing or spinning processes.

The coated substrates can be used as is ("uncured" or "undryed") or heated before processing. When heating is performed, the substrates are heated in an oven in air or under an inert atmosphere, for instance nitrogen or argon, at elevated temperatures usually not exceeding 300° C. and preferably at or below 180° C. for about from 0.25 to 12 hours, preferably for about 2 hours or less. The heating process removes the solvent carrier and may be used to further cure the polymer. For instance, in hybrid polymers where one component is a poly(amic) acid polymer the films can be thermally cured to imidize the poly(amic) acid portion to a polyimide.

The concentration of polymer and choice of solvents can affect the optical alignment quality, pretilt and voltage holding ratio (VHR). These choices affect the film thickness and how the film forms on the substrate, which can lead to differences in alignment quality, pretilt and VHR.

The optical alignment layers are exposed to polarized light to induce alignment of liquid crystals. By "polarized light" is meant light that is elliptically and/or partially polarized such that the light is more polarized along one axis (referred to as the major axis) versus the orthogonal axis (referred to as the minor axis). In this invention the polarized light has one or more wavelengths of about from 150 to 2000 nm and preferably of about from 150 and 1600 nm and more preferably about from 150 to 800 nm. Most preferably, the polarized light has one or more wavelengths of about from 150 to 400 nm, and especially about from 300 to 400 nm. A preferred source of light is a laser, e.g., an argon, helium neon, or helium cadmium. Other preferred sources of light are mercury arc deuterium and quartz tungsten halogen lamps, xenon lamps, microwave excited lamps and black lights in combination with a polarizer. Polarizers useful in generating polarized light from nonpolarized light sources are interference polarizers made from dielectric stacks, absorptive polarizers, diffraction gratings and reflective polarizers based on Brewster reflection. With lower power lasers or when aligning small alignment regions, it may be necessary to focus the light beam onto the optical alignment layer.

By "exposing" is meant that polarized light is applied to the entire optical alignment layer or to a portion thereof. The light beam may be stationary or rotated. Exposures can be in one step, in bursts, in scanning mode or by other methods. Exposure times vary widely with the materials used, etc., and can range from less than 1 msec to over an hour. Exposure may be conducted before or after contacting the optical alignment layer with the liquid crystal medium. Exposing can be accomplished by polarized light transmitted through at least one mask having a pattern or with a beam of polarized light scanned in a pattern. Exposing may be accomplished using interference of coherent optical beams forming patterns.

Exposing also can consist of two or more exposure steps wherein the conditions of each step such as angle of incidence, polarization state, energy density, and wavelength are changed. At least one of the steps must consist of exposure with linearly polarized light. Exposures can also be localized to regions much smaller than the substrate size to sizes comparable to the entire substrate size.

Exposure energy requirements vary with the formulation and processing of the optical alignment layer prior and during exposure. A preferred range of exposure energy is about from 0.001 to 100 J/cm$^2$ and most preferred range of exposure energy is about from 0.001 to 5 J/cm$^2$. Lower exposure energy is most useful in large scale manufacturing of optical alignment layers and liquid crystal display elements. Lower exposure energy also minimizes the risk of damage to other materials on the substrates.

The quality of alignment and electrical properties of the liquid crystal cell assembled from exposed substrates can be improved by heating the substrates during exposure and/or after exposure but prior to assembly and/or filling of the cell. This additional heating of the substrates is not a requirement of the process but can give beneficial results.

Applying a liquid crystal medium to the optical alignment can be accomplished by capillary filling of a cell, by casting of a liquid crystal medium onto an optical alignment layer, by laminating a preformed liquid crystal film onto an optical alignment layer or by other methods. Preferred methods are capillary filling of a cell, injection filling and casting of a liquid crystal medium onto an optical alignment layer. Optical alignment layers are pre-exposed to polarized light or they are exposed after contacting the liquid crystal medium.

The type of photochemistry that occurs and the molecular structure of the liquid crystal determines the alignment direction of the liquid crystal medium. The alignment of the liquid crystal medium is often described relative to the polarization of the polarized light in the plane of the optical alignment layer during exposure of the coated substrates. The liquid crystal medium is said to align "parallel" or "perpendicular" when the liquid crystal molecules are found to align predominately parallel or perpendicular to the polarization of the light in the plane of the coated substrates, respectively. Another class of alignment is homeotropic where the liquid crystal molecules align predominantly perpendicular to the alignment layer. Several photochemical mechanisms are possible in many hybrid polymers and the predominant ones are determined by film forming and exposure conditions (e.g., the temperature and atmosphere the films are exposed to prior to exposure, the temperature and atmosphere under which the exposure is performed, and the exposure energy density). The hybrid polymers can exhibit parallel, perpendicular or homeotropic alignment depending on which photochemical mechanism dominates and the liquid crystal molecular structure.

A cell can be prepared by using two coated substrates to provide a sandwiched layer of liquid crystal medium. The pair of substrates can both contain optical alignment layers or a conventional alignment layer (e.g., mechanically buffed) can be used as the second alignment layer comprising the same or a different polymer.

Liquid crystal substances for use with liquid crystal optical elements include, nematic liquid crystal substances, ferroelectric liquid crystal substances, vertical alignment liquid crystals (negative dielectric liquid crystals), etc. Useful liquid crystals for the invention described herein include positive dielectric liquid crystals including 4-cyano-4'-alkylbiphenyls, 4-cyano-4'-alkyloxybiphenyls, 4-alkyl-(4'-cyanophenyl)cyclohexanes, 4-alkyl-(4'cyanobiphenyl)cyclohexanes, 4-cyanophenyl-4'-alkylbenzoates, 4-cyanophenyl-4'alkyloxybenzoates, 4-alkyloxyphenyl-4'-cyanobenzoates, 4-alkylphenyl-4'alkylbenzoates, 1-(4'-alkylphenyl)-4-cyanopyrimidines, 1-(4'-alkyloxyphenyl)-4-cyanopyrimidines and 1-(4-cyanophenyl)-4-alkylpyrimidines. Other useful liquid crystals are new superfluorinated liquid crystals available from EM Industries, (Hawthrone N.Y.) including the commercial materials: ZLI-5079, ZLI-5080, ZLI-5081, ZLI-5092, ZLI-4792, ZLI-1828, MLC-2016, MLC-2019, MLC-6252 and MLC-6043. Other useful nematic materials for practicing the invention include the commercial liquid crystals available from Dinippon Ink and Chemicals, Inc. (Tokyo, Japan) including the DLC series: 22111, 22112, 22121, 22122, 23070, 23170, 23080, 23180, 42111, 42112, 42122, 43001, 43002, 43003, 63001, 63002, 63003, 63004, and 63005.

Polymerizable liquid crystal monomers also are useful in the invention. Preferred are those disclosed in U.S. Pat. No. 5,846,452, hereby incorporated by reference. The invention is not limited to the use of liquid crystals defined above. One skilled in the art will recognize that the invention will be of value with many diverse liquid crystal structures and formulations containing mixtures of liquid crystals.

The exposed optical alignment layer induces alignment of a liquid crystal medium at an angle with respect to the major axis of the polarization of the incident light beam and along the surface of the optical alignment layer. One skilled in the art will recognize that the process allows control of the alignment of a liquid crystal medium in any desired direction in and out of the plane of the optical alignment layer by controlling the conditions of the polarized light exposure.

A liquid crystal display element of the invention is composed of an electrode substrate having at least one hybrid polymer optical alignment layer of the invention, a voltage-impressing means and a liquid crystal material. FIG. 1 illustrates a typical liquid crystal display element, comprising a transparent electrode 2 of ITO (indium-tin oxide) or tin oxide on a substrate 1 and optical alignment layers 3 formed thereon. The optical alignment layers are exposed to polarized light of a wavelength or wavelengths within the absorption band of the anisotropically absorbing molecules. A spacer concurrently with a sealing resin 4 is intervened between a pair of optical alignment layers 3. A liquid crystal 5 is applied by capillary filling of the cell and the cell is sealed to construct a liquid crystal display element. Substrate 1 may comprise an overcoat film such as an insulating film, a color filter, a color filter overcoat, a laminated polarizing film etc. These coatings and films are all considered part of the substrate 1. Further, active elements such as thin film transistors, a nonlinear resistant element, etc. may also be formed on the substrate 1. These electrodes, undercoats, overcoats, etc. are conventional constituents for liquid crystal display elements and are usable in the display elements of this invention. Using the thus formed electrode substrate, a liquid crystal display cell is prepared, and a liquid crystal substance is filled in the space of the cell, to prepare a liquid crystal display element in combination with a voltage-impressing means.

Optical alignment layers of the invention are compatible with all liquid crystal display modes. A liquid crystal display element of the invention can comprise a variety of display configurations including twisted nematic, super twisted nematic, in-plane-switching, vertical alignment, active-matrix, cholesteric, polymer dispersed, ferroelectric, anti-ferroelectric and multi-domain liquid crystal displays. Although the display modes demonstrated in this specification are primarily twisted nematic, the optical alignment layers of the invention are not limited to use in twisted nematic liquid crystal displays.

Optical alignment layers of the invention are useful in many other liquid crystal devices other than liquid crystal displays. These include electro-optical light modulators, all-optical light modulators, erasable read/write optical data storage media; diffractive optical components such as gratings, beamsplitters, lenses (e.g., Fresnel lenses), passive imaging systems, Fourier processors, optical disc and radiation collimators; binary optical devices formed by combining refractive and diffractive optics including eyeglasses, cameras, night vision goggles, robotic vision and three-dimensional image viewing devices; and holographic devices such as heads-up displays and optical scanners.

Voltage Holding Ratio (VHR) is a critical electrical parameter for liquid crystal displays. VHR is a measure of the LCDs ability to retain a voltage during the time between pixel updates (frame time). The type of liquid crystal, alignment layers and cell geometry can all affect the measured VHR value. In the examples to follow, liquid crystal test cells comprising soda-lime substrates with patterned indium-tin-oxide (ITO) transparent electrodes are described. The overlap of the electrodes was about 1 cm$^2$ after the test cell was assembled. Approximately 2–3 inch wire leads were attached to the patterned ITO electrodes using an ultrasonic solder iron after the test cell is assembled but prior to filling. The leads were attached to a VHR measurement system (Elsicon VHR-100 Voltage Holding Ratio Measurement System, Newark, Del.) using test clips after the cell was filled and annealed. The VHR for the examples was measured for a 20 msec frame time at room temperature and 75° C.

The following Examples are meant to illustrate the invention and are not meant to be limiting:

EXAMPLE 1

The following example describes the synthesis of novel Addition Monomer 1 for use in hybrid polymers of the invention.

3-[4-(6-Hydroxy-hexyloxy)-phenyl]-acrylic acid methyl ester

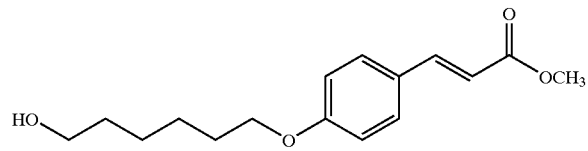

3-(4-Hydroxy-phenyl)-acrylic acid methyl ester (40 g, 225 mmol) was dissolved in 300 ml of NMP. 6-Chlorohexanol (269 mmol, 36.8 g), anhydrous potassium carbonate (37.2 g, 269 mmol) and a catalytic amount of potassium iodide were added. The batch was stirred at 90° C. for 32 hours. Water was added to the cooled solution, which was subsequently extracted with 3×200 mls of ethyl acetate. The combined organics were washed with 10% KOH (2×100 mls), brine solution and then dried over magnesium sulfate. The concentrated product was then recrystallized from a 1:1 mixture of ethyl acetate/hexane to give 45 gm (72% yield) of an off-white solid. 2-Methyl-acrylic acid 6-[4-(2-methoxycarbonyl-vinyl)-phenoxy]-hexyl ester (Addition Monomer 1)

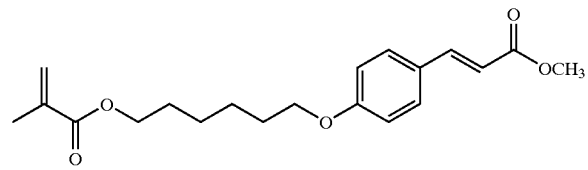

To an ice-cooled solution of 20 gm (72 mmol) 3-[4-(6-hydroxy-hexyloxy)-phenyl]-acrylic acid methyl ester, 11.7 gm (116 mmol) triethylamine and 4 crystals of BHT in 150 ml of dichloromethane was added dropwise 11.3 gm (108 mmol) of methacryloyl chloride in 5 ml dichloromethane. The mixture was allowed to react for 2 hours, at which time the dichloromethane was removed under reduced pressure. The mixture was partitioned between water (100 ml) and ethyl acetate (100 ml) and the aqueous layer subsequently extracted twice more with 100 ml portions of ethyl acetate. The combined organic layers were washed with 100 ml portions of 1M HCl, water, 5% sodium hydrogen carbonate and brine and then dried with magnesium sulfate and concentrated. Recrystallization from ethanol gave 18 gm (72% yield) of a white solid. H$^1$ NMR (CDCl$_3$): 7.65 (d, 1H, J=16 Hz), 7.47 (dd, 2H, J=2.1, 6.4 Hz), 6.89 (dd, 2H, J=1.9, 6.6 Hz), 6.30 (d, 1H, J=15.7 Hz), 6.1 (m, 1H), 5.56 (m, 1H), 4.17 (m, 2H), 4.00 (m, 2H), 3.80 (s, 3H), 1.95 (m, 3H), 1.8–1.4 (m, 8H).

EXAMPLE 2

The following example describes the synthesis of novel Addition Monomer 2 for use in hybrid polymers of the invention.

Acetic Acid 4-iodo-phenyl Ester

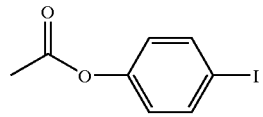

4-Iodophenol (25 g) and acetic anhydride (25 mL) were combined in a 250 mL Erlenmeyer flask. Pyridine (10 mL) was added carefully over 10 min. The reaction was kept at room temperature overnight, then poured into separatory funnel containing 100 mL water and extracted with ether (2×100 ml). The combined organics were washed with water (2×100 ml) and brine and then dried over MgSO$_4$. The crude concentrate was recrystallized from hexane to give 25.5 g of acetate.

4-Heptadecafluorooctyl-phenol

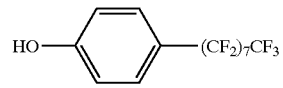

To a solution of acetic acid 4-iodo-phenyl ester (9 gm, 36.6 mol) in anhydrous DMSO (75 mL) was added copper powder (5.8 g, 0.091 mol), perfluorooctyl iodide (25 g, 0.046 mol) and iodine (130 mg). The reaction mixture was heated to 105° C. for 18 hr, cooled, combined with 100 ml water and 50 ml ether and filtered to remove insoluble copper salts. The organic and aqueous layers in the filtrate were separated, and the aqueous layer extracted twice with ether (2×100 mL). The combined organics were washed with water and brine, dried over MgSO$_4$, and concentrated. To a solution of the crude product in 50 mL methanol was added 1.5 mL 1 ON HCl. The mixture was refluxed on a steam bath for 1 hr to hydrolyze the acetate completely to the phenol. After cooling to room temperature, the reaction mixture was poured into a separatory funnel containing 100 mL water, and extracted with ether (3×75 mL). The combined organics were washed with water and brine and dried over MgSO$_4$. Recrystallization of the crude concentrate gave 12.5 g of the phenol at 99% purity by HPLC as a waxy solid mp 63–68° C.

2-Methyl-acrylic Acid 4-heptadecafluorooctyl-phenyl ester, Addition Monomer 2.

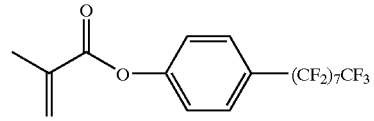

To an ice-cooled solution of 4-heptadecafluorooctyl-phenol (4 gm, 7.8 mmol), triethylamine (0.95 gm, 9.4 mmol) and 4 crystals of BHT in 20 ml of dichloromethane was added dropwise methacryloyl chloride (0.98 gm, 9.4 mmol) in 5 ml dichloromethane. The mixture was allowed to react for 1 hour, at which time the dichloromethane was removed under reduced pressure. The mixture was partitioned between water (50 ml) and ethyl acetate (50 ml) and the aqueous layer subsequently extracted twice more with 50 ml portions of ethyl acetate. The combined organic layers were washed with 50 ml portions of 1M HCl, water, 5% sodium hydrogen carbonate and brine and then dried with magnesium sulfate and concentrated. Recrystallization from hexane gave 2.8 gm (62% yield) of a white solid. $H^1$ NMR (CDCl$_3$): 7.63 (d, 2H, J=8.6 Hz), 7.30 (d, 2H, J=8.8 Hz), 6.39 (m, 1H), 5.82 (m, 1H), 2.08 (m, 3H).

EXAMPLE 3

The following example describes the synthesis of novel Addition Monomer 3 for use in hybrid polymers of the invention.

4-(6-Hydroxy-hexyloxy)-benzaldehyde

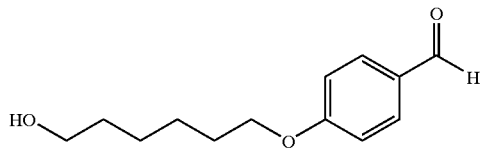

4-Hydroxybenzaldehyde (15 g, 122 mmol) was dissolved in 150 ml of NMP. 6-Chlorohexanol (20.16 gm 146 mmol), anhydrous potassium carbonate (20.36 g, 146 mmol) and a catalytic amount of potassium iodide were added. The batch was stirred at 90 C for 24 hours. Water was added to the cooled solution, which was subsequently extracted with 3×100 mls of ethyl acetate. The combined organics were washed with 5% KOH (2×100 ml s), brine solution and then dried over magnesium sulfate. The concentrated product was then recrystallized from a 1:1 mixture of ethyl acetate/hexane to give 14 gm of an off-white solid.

3-[4-(6-Hydroxy-hexyloxy)-phenyl]-1-(4-iodo-phenyl)-propenone

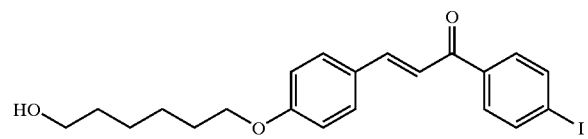

4-Iodoacetophenone (2.46 gm, 10 mmol) was dissolved in 20 ml toluene. 4-(6-Hydroxyhexyloxy)benzaldehyde (10 mmol, 2.22 gm), potassium hydroxide (15 mmol, 0.84 gm in 4 ml water) and Aliquat 336 (0.2 gm) were added and the mixture stirred vigorously for 1 hr. The formed precipitate was filtered, washed with water and toluene and dried under vacuum, yielding 1.9 gm product.

3-[4-(6-Hydroxy-hexyloxy)-phenyl]-1-(4-tridecafluorohexyl-phenyl)-propenone

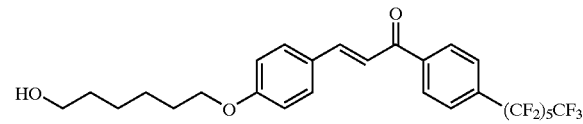

To a solution 3-[4-(6-hydroxy-hexyloxy)-phenyl]-1-(4-iodo-phenyl)-propenone (1.9 gm, 4.22 mmol) in anhydrous DMSO (10 mL) was added copper powder (0.67 g, 10.55 mmol), perfluorohexyl iodide (2.35 g, 5.28 mmol) and a catalytic amount of iodine. The reaction mixture was heated to 105° C. for 24 hr, cooled, combined with 100 ml water and 50 ml ethyl acetate and filtered to remove insoluble copper salts. The organic and aqueous layers in the filtrate were separated, and the aqueous layer extracted with ethyl acetate. The combined organics were washed with water and brine, dried over MgSO$_4$ and concentrated. Recrystallization from 25% ethyl acetate in hexane gave 1.6 gm of product.

2-Methyl-acrylic acid 6-{4-[3-oxo-3-(4-tridecafluorohexyl-phenyl)-propenyl]-phenoxy}-hexyl ester (Addition Monomer 3)

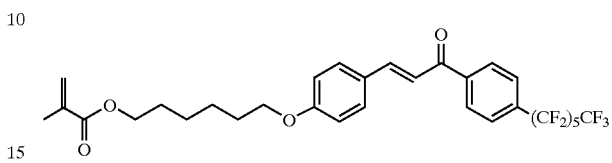

To an ice-cooled solution of 3-[4-(6-hydroxy-hexyloxy)-phenyl]-1-(4-tridecafluorohexyl-phenyl)-propenone (2.3 gm, 3.58 mmol), triethylamine (0.58 gm, 5.73 mmol) and 4 crystals of BHT in 20 ml of dichloromethane was added dropwise, methacryloyl chloride (0.56 gm, 5.73 mmol) in 5 ml dichloromethane. The mixture was allowed to react for 1 hour, at which time the dichloromethane was removed under reduced pressure. The mixture was partitioned between water (50 ml) and ethyl acetate (50 ml) and the aqueous layer subsequently extracted twice more with 50 ml portions of ethyl acetate. The combined organic layers were washed with 50 ml portions of 1M HCl, water, 5% sodium hydrogen carbonate and brine and then dried with magnesium sulfate and concentrated. Recrystallization from ethyl acetate gave 1.2 gm of product. $H^1$ NMR (CDCl$_3$): 8.12 (d, 2H, J=10.5 Hz), 7.82 (d, 1H, J=15.8 Hz), 7.74 (d, 2H, J=8.4 Hz), 7.61 (d, 2H, J=8.9 Hz), 7.38 (d, 1H, J=15.5 Hz), 6.94 (d, 2H, J=8.9 Hz), 6.10 (s, 1H), 5.55 (m, 1H), 4.17 (m, 2H), 4.02 (m, 2H), 1.95 (m, 3H), 1.4–1.9 (m, 8H).

EXAMPLE 4

The following example describes the synthesis of novel Addition Monomer 4 for use in hybrid polymers of the invention.

2-Methyl-acrylic Acid 6-{4-[3-(2-methyl-acryloyloxy)-3-oxo-propenyl]-phenoxy}-hexyl ster

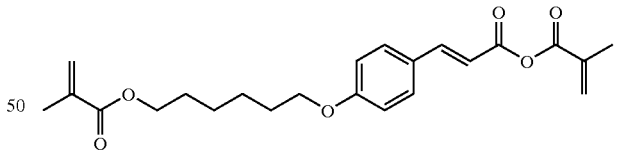

To an ice-cooled solution of 3-[4-(6-hydroxy-hexyloxy)-phenyl]-acrylic acid (4.1 gm, 15.5 mmol), triethylamine (4.08 gm, 40 mmol) and BHT (a few crystals) in 40 ml of dichloromethane was added dropwise methacryloyl chloride (4.05 gm, 39 mmol) in 5 ml dichloromethane. The reaction mixture was allowed to react for 2 hours, at which time the dichloromethane was removed under reduced pressure. The mixture was partitioned between 1M HCl (100 ml) and ethyl acetate (75 ml) and the aqueous layer subsequently extracted twice more with 75 ml portions of ethyl acetate. The combined organic layers were washed with 100 ml portions 5% sodium hydrogen carbonate and brine and then dried with magnesium sulfate and concentrated to give 5 gm of a white solid.

2-Methyl-acrylic Acid 6-{4-[2-(2,2,3,3,4,4,5,5,6,6,7,7,8,8,8-pentadecafluoro-octyloxycarbonyl)-vinyl]-phenoxy}-hexyl ester (Addition Monomer 4)

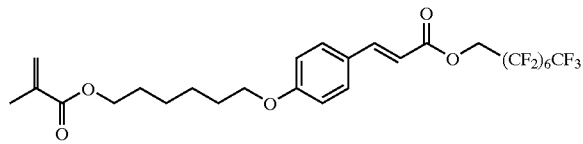

2-Methyl-acrylic acid 6-{4-[3-(2-methyl-acryloyloxy)-3-oxo-propenyl]-phenoxy}-hexyl ester (4 gm, 10 mmol), 1H,1H,2H,2H-perfluorooctanol (4 gm, 10 mmol) and dimethylaminopyridine (1.34 gm, 11 mmol) were dissolved in 40 ml of dichloromethane. The solution was allowed to react for 16 h, at which time the dichloromethane was removed under reduced pressure. The mixture was dissolved in ethyl acetate (75 ml) and washed twice with 1 M HCl. The aqueous layer was backwashed with 75 ml of ethyl acetate. The combined organic layers were washed with 100 ml portions 5% sodium hydrogen carbonate and brine and then dried with magnesium sulfate and concentrated. Silica gel chromatography, followed by recrystallization from ethyl acetate/hexane (1:9) gave 2.2 gm of product. $H^1$ NMR ($CDCl_3$): 7.74 (d, 1H, J=16 Hz), 7.49 (d, 2H, J=8.7 Hz), 6.90 (dd, 2H, J=8.7 Hz), 6.35 (d, 1H, J=16.0 Hz), 6.1 (m, 1H), 5.56 (m, 1H), 4.71 (t, 2H, J=13.9 Hz), 4.17 (m, 2H), 4.00 (m, 2H), 1.95 (m, 3H), 1.9–1.4 (m, 8H).

EXAMPLE 5

The following example describes the novel synthesis of activated Polyimide 1 for use in hybrid polymers of the invention.

4,4'-Methylenebis(2-methylcyclohexylamine) (279.3 mg, 1.17 mmol) was dissolved in 2.77 g anhydrous NMP under nitrogen atmosphere. Solid 5-(2,5-dioxotetrahydrol)-3-methyl-3-cyclohexene-1,2-dicarboxylic anhydride (412.6 mg, 1.56 mmol) was added, a precipitate formed. The solution was heated to 60 C to redissolve the precipitate. After 16.5 h, the temperature was dropped to 50 C and a solution of 4-vinylaniline (93.1 mg, 0.78 mmol) in 0.37 g NMP was added. Stirring was continued for an additional 3 h followed by the addition of acetic anhydride (0.48 g, 4.7 mmol), pyridine (0.20 g, 2.5 mmol) and a continued stirring at 50C for 3 h. Polyimide 1 was precipitated by addition to a large excess of methanol. The solid was washed with additional portions of methanol and dried under vacuum (0.2 mmHg) at room temperature overnight. Yield 0.39 g (65% Mw 6600).

EXAMPLE 6

The following example describes the novel synthesis of activated Polyimide 2 for use in hybrid polymers of the invention.

Diamines N,N-diallyl-1,2,5-benzenetriamine (216.5 mg, 1.066 mmol) and N,N-diallyl-1,2,4-benzenetriamine (216.5 mg, 1.066 mmol, the synthesis of these two diamines are described in U.S. Pat. No. 6,103,322) were dissolved in 2.98 g anhydrous NMP under a nitrogen atmosphere. Solid 1,2,3,4-cyclobutanetetracarboxylic dianhydride (313.5 mg, 1.598 mmol) was added and the solution was stirred at 21 C for 19 h. In succession were added triethylamine (0.16 g, 1.6 mmol), BHT (2 mg), and acryloyl chloride (122 mg, 1.35 mmol). The solution was stirred for an additional 1 h at 21 C. Next were added acetic anhydride (0.49 g, 4.8 mmol) and pyridine (0.21 g, 2.7 mmol), the solution was heated to 50 C and stirred for an additional 3 h. The polyimide was isolated by precipitation into a large excess of methanol and washed with additional methanol. Solvent was removed under vacuum (0.2 mmHg) at room temperature overnight. Yield 0.77 g (107%, Mw 4,000). From this batch, 0.69 g was stirred in THF (10 g) for 3 h forming a fine haze that did not completely dissolve. The slurry was added to 40 ml methanol and centrifuged. The pellet was placed under vacuum overnight (0.1 mmHg) yielding 0.45 g (70% overall yield, Mw 4,100). 1H NMR (DMSO-$D_6$) confirmed the presence of acrylamide endgroups.

EXAMPLE 7

The following example describes the novel synthesis of activated Polyimide 3 for use in hybrid polymers of the invention.

N,N-Diallyl-1,2,4-benzenetriamine (828.1 mg, 4.08 mmol) was dissolved in 6.59 g anhydrous NMP under nitrogen atmosphere. Solid 1,2,3,4-cyclobutanetetracarboxylic dianhydride (819.9 mg, 4.18 mmol) was added. After 20 h, the temperature was increased to 50° C. and a solution of 4-vinylaniline (24.9 mg, 0.21 mmol) in 0.10 g NMP was added. Stirring was continued for an additional 3 h followed by the addition of NMP (3.0 g) acetic anhydride (1.28 g, 12.5 mmol), pyridine (0.54 g, 6.8 mmol) and a continued stirring at 50° C. for 3 h, then stirred at room temperature for 16 h. Polyimide 3 was precipitated by addition to a large excess of methanol. The solid was washed with additional portions of methanol and dried under vacuum (0.2 mmHg) at room temperature overnight. Yield 2.22 g (132% yield). The excess weight was assumed to be solvent and the amount of polymer used in subsequent reactions was adjusted accordingly.

EXAMPLE 8

The following example describes the novel synthesis of the diamine 1-[4-vinylphenoxy]-2,5-benzenediamine for use in hybrid polymers of the invention.
Synthesis of 4-vinylphenol

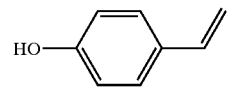

To 16.4 g (0.101 mmol) acetoxystyrene in 150 ml water at 3 C was added 16.8 g KOH dissolved in a minimal amount of ice water. The solution was stirred in an ice bath 2 h. 23.7 g solid $NaHCO_3$ was added and stirred 20 minutes, precipitating the product, which was filtered off, washed with water and dried under vacuum overnight. Yield 10.46 g (86%).
Synthesis of 4-nitro-3-(4'-vinylphenoxy)aniline

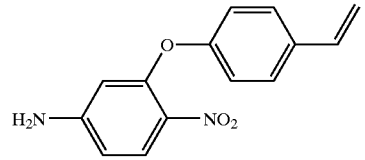

A mixture of 3-fluoro-4-nitroaniline (3.35 g, 21.5 mmol), 4-vinylphenol (3.26 g, 27.1 mmol), 9 g $K_2CO_3$ and 2–3 crystals of BHT inhibitor was dissolved in 100 ml NMP and stirred at 60 C under nitrogen for 4 days. The reaction mixture was added to 250 ml 1:1 v/v ethyl acetate/hexane and was washed with 2×200 ml water, 2×125 ml 1 N KOH, 125 ml water, 125 ml brine, dried with anhydrous MgSO$_4$ and concentrated. The residue was crystallized from 40 ml ethyl acetate and 60 ml hexane yielding 4 g product (73%). Synthesis of 1-[4-vinylphenoxy]-2,5-benzenediamine

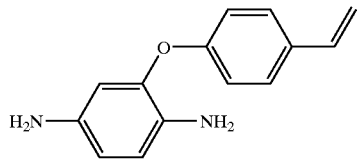

4-Nitro-3-(4'-vinylphenoxy)aniline (1.0 g, 3.9 mmol) was dissolved in 40 ml absolute ethanol. In succession, tin(II) chloride (4.45, 5 eq), and 10N HCl (2.3 ml, 6 eq) were added. The solution was stirred at room temperature 48 h, cooled to −20 C and added to 150 ml 1:1 v/v ethyl acetate/ hexane, 41 g 20% KOH and 10 g ice (all at −20 C). The organic phase was reserved, the aqueous phase was extracted with 2×75 ml 1:1 v/v ethyl acetate/hexane. The combined organic phases were dried with brine, solid MgSO$_4$ and concentrated. Column chromatography yielded 0.84 g (95%) product. The product was crystallized from 1.5 ml ethyl acetate and 0.5 ml hexane prior to polymer synthesis. $^1$H NMR (CDCl$_3$): 7.36 (dd, 2H, J=7 Hz, 2 Hz), 6.93 (dd 2H, J=7 Hz, 2 Hz), 6.72 (dd 1H, J=17 Hz, 11 Hz), 6.68 (d, 1H, J=8.5 Hz), 6.40 (dd, 1H, J=8 Hz, 2 Hz), 6.29 (d, 1H, J=2 Hz), 5.60 (dd, 1 H, J=18 Hz, 0.75 Hz), 5.17 (dd, 1 H, J=11 Hz, 0.75 Hz), 3.25 (br s).

EXAMPLE 9

The following example describes the synthesis of novel activated Polyimide 4 for use in hybrid polymers of the invention.

The diamines N,N-diallyl-1,2,4-benzenetriamine (331.1 mg, 1.630 mmol) and 1-[4-vinylphenoxy]-2,5-benzenediamine (19.4 mg, 0.086 mmol) were dissolved in 2.75 g anhydrous NMP under nitrogen atmosphere. Solid 1,2,3,4-cyclobutanetetracarboxylic dianhydride (336.4 mg, 1.716 mmol) was added and the solution was stirred for 18 h at 21 C, becoming viscous. A mixture of 0.53 g acetic anhydride, 0.22 g pyridine and 5.15 g NMP was added and the solution stirred at 50C for 4 additional hours. The polyimide was precipitated by addition to a large excess of methanol. The solid was washed with additional portions of methanol. Solvent was removed under vacuum (0.2 mmHg) at room temperature overnight. Yield 1.034 g (165% Mw 128,000). The excess weight was assumed to be solvent and the amount of polymer used in subsequent reactions was adjusted accordingly.

EXAMPLE 10

The following example describes the synthesis of novel activated Polyimide 5 for use in hybrid polymers of the invention.

N,N-Diallyl-1,2,4-benzenetriamine (823 mg, 4.05 mmol) was dissolved in 6.47 g anhydrous NMP under nitrogen atmosphere. Solid 1,2,3,4-cyclobutanetetracarboxylic dianhydride (795 mg, 4.05 mmol) was added and the solution was stirred for 18 h at 21 C, becoming viscous. A mixture of 1.24 g acetic anhydride, 0.53 g pyridine and 12.2 g NMP was added and the solution stirred at 50C for 4 additional hours. The polyimide was precipitated by addition to a large excess of methanol. The solid was washed with additional portions of methanol. Solvent was removed under vacuum (0.2 mmHg) at room temperature overnight and at 60C for 3 h. Yield 1.78 g (Mw 84,000).

EXAMPLE 11

The following example describes the novel synthesis of the diamine 1-[4-vinylphenoxy]-2,4-benzenediamine for use in hybrid polymers of the invention.
Synthesis of 1-[4-vinylphenoxy]-2,4-dinitrobenzene

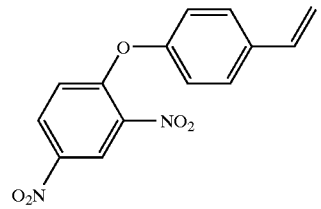

A mixture of 2,4-dinitrofluorobenzene (6.38 g, 34 mmol), 4-vinylphenol (4.32 g, 36 mmol), 4.97 g K$_2$CO$_3$ and 2–3 crystals of BHT inhibitor was dissolved in 75 ml NMP and stirred at 40° C. under nitrogen for 4 hr. The reaction mixture was poured into a separatory funnel containing 150 ml water and extracted 3×100 mls with ethyl acetate. The combined organics were washed with 100 ml 10% KOH, and brine, dried with anhydrous MgSO$_4$ and concentrated. The residue was recrystallized from 70% ethyl acetate in hexane yielding 9.5 g product.
Synthesis of 1-[4-vinylphenoxy]-2,4-benzenediamine

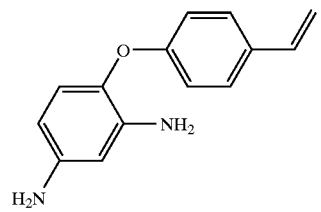

1-[4-Vinylphenoxy]-2,4-dinitrobenzene (9.0 g, 31 mmol) was dissolved in 100 ml ethanol/tetrahydrofuran (1:1). In succession, tin(II)chloride (70.9, 310 mmol), and 10N HCl (37.7 ml, 377 mmol) were added. The solution was stirred at room temperature 16 h. The reaction mixture was poured into a separatory funnel containing 150 ml ice-cold water followed by the addition of 20% KOH (ice-cold, 629 g). The mixture was extracted with ether (3×100 ml). The combined organic phases were washed with water (3×100 ml) and brine, dried with solid MgSO$_4$ and concentrated. Column chromatography yielded 4.5 g product. The product was crystallized from 40% ethyl acetate in hexane. $^1$H NMR (CDCl$_3$): 7.32 (d, 2H, J=8.5 Hz), 6.88 (d, 2H, J=8.6 Hz), 6.73 (d, 1H, J=8.3 Hz), 6.66 (dd, 1H, J=17.3, 11.9 Hz), 6.15 (d, 1H, J=2.9 Hz), 6.08 (dd, 1H, J=2.4, 8.2 Hz), 5.61 (dd, 1H, J=17.6 Hz, 0.8 Hz), 5.14 (d, 1H, J=10.9 Hz), 4.38 (br s, 4H).

EXAMPLE 12

The following example describes the synthesis of novel activated Polyimide 6 for use in hybrid polymers of the invention.

The diamines N,N-diallyl-1,2,4-benzenetriamine (230.2 mg, 1.133 mmol) and 1-[4-vinylphenoxy]-2,4-benzenediamine (13.5 mg, 0.0597 mmol) were dissolved in 1.91 g anhydrous NMP under nitrogen atmosphere. Solid 1,2,3,4-cyclobutanetetracarboxylic dianhydride (233.9 mg, 1.193 mmol) was added and the solution was stirred for 18 h at 21 C, becoming viscous. A mixture of 0.365 g acetic anhydride, 0.155 g pyridine and 3.58 g NMP was added and the solution stirred at 50C for 4 additional hours. The polyimide was precipitated by addition to a large excess of methanol. The solid was washed with additional portions of methanol. Solvent was removed under vacuum (0.2 mmHg) at room temperature overnight. Yield 0.54 g (112% Mw 68,000). The excess weight was assumed to be solvent and the amount of polymer used in subsequent reactions was adjusted accordingly.

EXAMPLE 13

The following example illustrates stable parallel alignment and pretilt in a novel hybrid polymer of the invention synthesized following Method 1, whereby the polyimide is bis-end functionalized with a polymerizable styrene moiety.

Synthesis of Hybrid Polymer 1

A mixture of 100 mg Polyimide 1 and 300 mg of Addition Monomer 1 was dissolved in 13 g dimethylformamide (DMF) containing 13.3 mg azobisisobutyronitrile (AIBN). The solution was degassed by three consecutive freeze-pump-thaw cycles and sealed under vacuum. The solution was stirred at 60 C for 16 h. The solvent was removed at reduced pressure (1 mmHg/40 C) and the residue redissolved at a concentration of about 10% and precipitated into 50 ml methanol. The residue was redissolved and precipitated three more times for a total of 4 precipitations. Solvent was removed under vacuum (80 C, 0.05 mmHg). The yield was 212 mg (53%) powder having a MW of approximately 43,000).

A solution for spin-coating was prepared at 2% in DMF. The following general procedure was used to fabricate test cells for materials described in Examples 13 to 24. Any exceptions to this procedure will be noted in the specific examples.

Two 0.9 inch by 1.2 inch by 1 millimeter thick soda lime glass substrates with transparent indium-tin-oxide (ITO) coatings (DCI, Inc. Lenexa, Kans. 66219) were spin-coated with 2 wt % hybrid polymer in DMF. To aid in the wetting of the polymer, the substrates were heated to 85° C.–95° C. for three minutes immediately prior to spin coating. Spin coating was achieved by filtering the hybrid polymer solution through a 0.45 micron Teflon filter membrane onto the surface of the substrates. The substrates were spun at 2500 RPM for 1 minute to produce uniform thin films and cured at 130 C for 1 hr under nitrogen to give optical alignment layers.

The substrates were then exposed to polarized ultraviolet (UV) light with a model OM-SEMT optics module (Elsicon, Inc., Newark, Del.) in an OptoAlign™ model E3-UV-600-A lamp exposure unit (Elsicon, Inc., Newark, Del.).

After exposure, the substrates were assembled with orthogonal orientation of the optically generated alignment direction. In this case, the alignment direction was assumed to be parallel (this was confirmed by further experiments discussed later in this example). The cell thickness was about 4 microns. The cell was subsequently capillary filled with nematic liquid crystals suitable for active matrix liquid crystal displays. As expected, the liquid crystals were observed to align in a twisted nematic (TN) orientation when viewed between polarizers. Upon annealing the liquid crystal cell above the liquid crystal isotropic point (120° C. for 30 minutes), the uniformity of the alignment was observed to improve.

For this and other examples, a guest-host liquid crystal cell (G/H) was also manufactured to determine if the alignment was parallel or perpendicular. The substrates for the G/H cell were prepared, exposed at 0.5 J/cm², and assembled as with the TN cell except that the alignment directions were arranged antiparallel to each other. A liquid crystal mixture, similar to that used in the TN cells but without chiral dopant and containing 1% diazodiamine dye as an anisotropic guest (Gibbons et. al., Nature, Vol. 351, 1991, pp 49–50), was used to capillary fill the cell. After sealing and a 120C anneal for 30 minutes, the long axis of the dye was observed to align uniformly and parallel to the polarization direction of the incident light for the novel hybrid polymer of this example.

Table 5 lists the exposure energy density levels, alignment quality, pretilt (measured using the PAS-301 measurement system (Elsicon, Inc., Newark, Del.)) and VHR (measured using the VHR-100 measurement system, Elsicon, Inc., Newark, Del.) for annealed TN cells manufactured with the novel hybrid polymer of this example. For all examples, the ratings for alignment quality are given by the following scale:

• Excellent alignment, no flow effects, high uniformity.

○ Good alignment, low flow effects, uniform.

Δ Fair alignment, flow effects, some nonuniformity (mottled or cloudy background).

X Poor alignment, severe flow effects, nonuniform.

+ Levels of improvement, Δ<Δ+<Δ++<○.

TABLE 5

| UV Energy (J/cm²) | Alignment quality | Pretilt (degrees) | VHR at 75° C. |
|---|---|---|---|
| 0.2 | O+ | 15 | 0.87 |
| 0.5 | O+ | 2 | 0.91 |
| 2 | O+ | 1 | 0.87 |

EXAMPLE 14 (Comparative)

The following comparative example shows that the polyimide portion of Hybrid Polymer 1 does not align, has no pre-tilt, and has lower VHRs at exposure energy densities between 0.5 to 10 J/cm².

Polyimide 1, without photoactive methacrylate, was polymerized in a similar manner to Hybrid Polymer 1 in Example 12, using 227 mg of the polyimide, 3.33 g DMF and 10.5 mg AIBN (60 C, 16 h, crude Mw 36,000). The polymer was purified by 3 successive precipitations from DMF into isopropyl alcohol. Solvent was removed under vacuum (80 C, 0.05 mmHg). The yield was 81.4 mg (36%) powder. TN cells were prepared, assuming perpendicular alignment, using alignment layers spin-coated from a 3 wt % DMF solution. The characterization data is summarized in Table 6.

TABLE 6

| UV Energy (J/cm²) | Alignment quality | Pretilt (degrees) | VHR at 75° C. |
|---|---|---|---|
| 0.5 | X | — | 0.70 |
| 2 | X | — | 0.78 |
| 5 | X | — | 0.72 |
| 10 | X | — | 0.79 |

EXAMPLE 15

The following is an example of a novel hybrid polymer of Method 1 whereby the polyimide portion is bis-end functionalized with an acrylamide group.

Synthesis of Hybrid Polymer 2

Similar to the procedure above for the Hybrid Polymer 1, the Hybrid Polymer 2 was prepared from 100 mg Polyimide 2 and 300 mg Addition Monomer 1 in 20 g DMF containing 20 mg AIBN. The yield after purification was 242 mg (60%, Mw 19,000). TN cells were prepared using alignment layers spin-coated from a 3 wt % DMF solution. The characterization data is summarized in Table 7. The hybrid polymer of this example shows good TN alignment properties at 0.5 J/cm$^2$ and a G/H cell exposed at 5 J/cm$^2$ demonstrated parallel alignment. For pretilt, ~0 means nominally 0 degrees for the pretilt.

TABLE 7

| UV Energy (J/cm$^2$) | Alignment quality | Pretilt (degrees) | VHR at 75° C. |
|---|---|---|---|
| 0.2 | X+ | ~0 | 0.81 |
| 0.5 | Δ++ | ~0 | 0.85 |
| 5 | X++ | ~0 | 0.90 |

EXAMPLE 16

The following example illustrates good quality alignment and pretilt in a novel hybrid polymer of the invention synthesized following Method 1, whereby the polyimide is functionalized by placing polymerizable styrene groups on the ends. By using an Addition Monomer that contains a chalcone and fluoroalkyl group, pre-tilt is demonstrated with the novel hybrid polymer of this example.

Synthesis of Hybrid Polymer 3

Similar to the procedure above for Hybrid Polymer 1, Hybrid Polymer 3 was prepared from 200 mg Polyimide 3, and 569 mg Addition Monomer 1 and 30 mg Addition Monomer 3 in 23.4 g DMF containing 26 mg AIBN. The polymer was purified by first partially concentrating and precipitating from DMF into methanol, washing twice with toluene and then precipitating twice more from DMF into 60% toluene in methanol yielding 298 mg polymer. TN cells were prepared using alignment layers spin-coated from a 2 wt % DMF solution except in this case the substrates were not cured. The characterization data is summarized in Table 8.

TABLE 8

| UV Energy (J/cm$^2$) | Alignment quality | Pretilt (degrees) | VHR at 75° C. |
|---|---|---|---|
| 0.2 | O | −10.7 | 0.86 |
| 0.5 | O | −1.5 | 0.77 |

EXAMPLE 17

The following example illustrates good alignment and good VHR properties at 2 J/cm$^2$ in a novel hybrid polymer of the invention synthesized following Method 2, whereby the polyimide is functionalized by placing a polymerizable styrene moiety on the diamine.

Synthesis of Hybrid Polymer 4

Similar to the procedure above for Hybrid Polymer 1, Hybrid Polymer 4 was prepared from 200 mg Polyimide 4 (330 mg of solvent-containing polymer) and 600 mg Addition Monomer 1 in 40 g DMF containing 40 mg AIBN. The polymer solution was partially concentrated and purified by three successive precipitations from DMF into: 2×37% toluene in methanol, 50% toluene in methanol, extracted once with toluene, and finally precipitated from DMF into 60% toluene in methanol. The product was dried under vacuum at room temperature for 16 h, then 80° C. for 1 hr yielding 155 mg polymer (19%, Mw 312,000) after solvent removal under vacuum. TN cells were prepared using alignment layers spin-coated from a 2 wt % DMF solution, except in this case the substrates were not cured. The hybrid polymer of this example shows good TN alignment properties at 2.0 J/cm$^2$ and a G/H cell exposed at 2 J/cm$^2$ demonstrated perpendicular alignment. The characterization data is summarized in Table 9.

TABLE 9

| UV Energy (J/cm$^2$) | Alignment quality | Pretilt (degrees) | VHR at 75° C. |
|---|---|---|---|
| 0.5 | X | ~0 | 0.96 |
| 2 | Δ++ | ~0 | 0.96 |

EXAMPLE 18

The following example illustrates stable alignment and pretilt in a novel hybrid polymer of the invention synthesized following Method 2, whereby the polyimide is functionalized by placing polymerizable allyl groups on the diamines. One of the addition monomer contains a fluoroalkyl group to induce pre-tilt.

Synthesis of Hybrid Polymer 5

Similar to the procedure above for Hybrid Polymer 4, Hybrid Polymer 5 was prepared from 200 mg Polyimide 5 and 581 mg Addition Monomer 1 and 20 mg Addition Monomer 2 in 26 g DMF containing 27 mg AIBN. The polymer was purified by first partially concentrating and precipitating from DMF into methanol, washing twice with toluene and then precipitating twice more from DMF into 60% toluene in methanol yielding 260 mg polymer after solvent removal under vacuum. TN cells were prepared using alignment layers spin-coated from a 2 wt % DMF solution, except in this case the substrates were not cured. The characterization data is summarized in Table 10.

TABLE 10

| UV Energy (J/cm$^2$) | Alignment quality | Pretilt (degrees) | VHR at 75° C. |
|---|---|---|---|
| 0.5 | Δ++ | −10.5 | 0.82 |
| 2 | O+ | −0.8 | 0.65 |

EXAMPLE 19

The following example illustrates good alignment and pretilt in a novel hybrid polymer of the invention synthesized following Method 2, whereby the polyimide is functionalized by placing polymerizable allyl groups on the diamines and the addition monomer contains a fluoroalkyl group to induce pre-tilt.

Synthesis of Hybrid Polymer 6

Similar to the procedure above for Hybrid Polymer 1, Hybrid Polymer 6 was prepared from 203 mg Polyimide 5 and Addition Monomer 2 (67 mg) in 13 g DMF containing 13 mg AIBN. The polymer was purified by first partially concentrating and precipitating twice from DMF into 60% toluene in methanol, yielding 235 mg polymer after solvent removal under vacuum. TN cells were prepared, assuming perpendicular alignment, using alignment layers spin-coated from a 2 wt % DMF solution. In this case, the substrates were not cured and the substrates were exposed using the model E2-SEM1 optics module (Elsicon, Inc., Newark, Del.). The characterization data is summarized in Table 11.

TABLE 11

| UV Energy (J/cm$^2$) | Alignment quality | Pretilt (degrees) | VHR at 75° C. |
|---|---|---|---|
| 5 | Δ | −1.1 | 0.87 |

EXAMPLE 20 (Comparative)

The following comparative example demonstrates that there is no pretilt, a desired property, in Polyimide 5, the polyimide portion of Hybrid Polymer 5 of Example 18. TN cells were prepared, assuming perpendicular alignment, using alignment layers spin-coated from a 3 wt % N-methylpyrrolidinone (NMP) solution. In this case, the substrates were cured at 80 C for 15 min followed by 200 C for 60 min and the substrates were exposed using the model E2-SEM1 optics module (Elsicon, Inc., Newark, Del.). The characterization data is summarized in Table 12.

TABLE 12

| UV Energy (J/cm$^2$) | Alignment quality | Pretilt (degrees) | VHR at 75° C. |
|---|---|---|---|
| 10 | Δ+ | ~0 | 0.94 |

EXAMPLE 21

The following example illustrates good quality alignment and pretilt in a novel hybrid polymer of the invention synthesized following Method 2, whereby the polyimide is functionalized by placing polymerizable allyl groups on the diamines. By using an Addition Monomer that contains a chalcone and fluoroalkyl group, pre-tilt is demonstrated with the novel hybrid polymer of this example.

Synthesis of Hybrid Polymer 7

Similar to the procedure above for Hybrid Polymer 5, Hybrid Polymer 7 was prepared from 200 mg Polyimide 5, and 570 mg Addition Monomer 1 and 30 mg Addition Monomer 3 in 25 g DMF containing 25 mg AIBN, yielding 297 mg polymer. TN cells were prepared using alignment layers spin-coated from a 2 wt % DMF solution except in this case the substrates were not cured. Another desired property of TN cells is long term stability of the cell optical and electrical properties. An accelerated aging test was developed to test these properties. The cells were aged up to six to seven days at 85° C. For the novel hybrid polymer of this example relatively stable alignment, pre-tilt and VHR values were observed. The characterization data is summarized in Table 13.

TABLE 13

| UV Energy (J/cm$^2$) | Aging days at 85° C. | Alignment quality | Pretilt (degrees) | VHR at 75° C. |
|---|---|---|---|---|
| 0.2 | 0 | O | −13.5 | 0.77 |
|  | 3 | O+ | −11 | 0.88 |
|  | 6 | O+ | −10.6 | 0.86 |

TABLE 13-continued

| UV Energy (J/cm$^2$) | Aging days at 85° C. | Alignment quality | Pretilt (degrees) | VHR at 75° C. |
|---|---|---|---|---|
| 0.5 | 0 | O | −2.1 | 0.81 |
|  | 3 | O | −1.9 | 0.84 |
|  | 6 | O | −1.3 | 0.78 |

EXAMPLE 22 (Comparative)

The following comparative example demonstrates the decreased VHR stability of the addition polymer, Polymethacrylate 1 (poly[1-(6-[4[(E)-2-methoxycarbonyl-vinyl]-phenoxy]-hexyloxycarbonyl]-1-methyl-ethylene) upon aging at 85° C. Polymethacrylate 1 is a polymer based on one of the Addition Monomers in the novel hybrid polymer of Example 21.

Polymethacrylate 1:

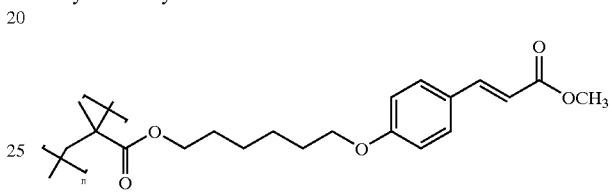

A solution of 1 g Addition Monomer 1 was added to DMF (9 g) containing 10 mg AIBN. The mixture was degassed by bubbling a stream of nitrogen through the solution for 30 minutes at room temperature, followed by heating under nitrogen at 60° C. for 16 hours. The solution was purified by three successive precipitation cycles into methanol (redissolving in THF to about 10 wt %), followed by solvent removal under vacuum (0.1 mmHg) at room temperature then 80° C. (4 h). The yield was 0.6 g (80%, Mw 128,000). TN cells were prepared using alignment layers spin-coated from a 2 wt % cyclopentanone solution and cured at 90–100 C for 1 hour in a nitrogen atmosphere. The characterization data is summarized in Table 14.

TABLE 14

| UV Energy (J/cm$^2$) | Aging days at 85° C. | Alignment quality | Pretilt (degrees) | VHR at 75° C. |
|---|---|---|---|---|
| 0.2 | 0 | O | 21.8 | 0.84 |
|  | 3 | O+ | 20.1 | 0.61 |
|  | 7 | O | 21 | 0.48 |
| 0.5 | 0 | O+ | 1.9 | 0.91 |
|  | 3 | O+ | 1.0 | 0.53 |
|  | 7 | Δ++ | 1.2 | 0.43 |

EXAMPLE 23

The following example illustrates good quality alignment and pretilt in a novel hybrid polymer of the invention synthesized following Method 2, whereby the polyimide is functionalized by placing polymerizable allyl groups on the diamines. By using an Addition Monomer that contains a cinnamate and fluoroalkyl group, pre-tilt is demonstrated with the novel hybrid polymer of this example.

Synthesis of Hybrid Polymer 8

Similar to the procedure above for the Hybrid Polymer 5, the Hybrid Polymer 8 was prepared from 200 mg Polyimide 5, 570 mg Addition Monomer 1 and 30 mg of Addition Monomer 4 in 26 g DMF containing 26 mg AIBN. The yield after purification was 260 mg. The molecular weight of the final polymer, as determined by gel permeation chromatography, was 91,000. TN cells were prepared using alignment layers spin-coated from a 2 wt % DMF, except in this case the substrates were not cured. The characterization data is summarized in Table 15.

TABLE 15

| UV Energy (J/cm²) | Alignment quality | Pretilt (degrees) | VHR at 75° C. |
|---|---|---|---|
| 0.5 | Δ+ | −1.6 | 0.85 |
| 2 | O+ | −0.3 | 0.92 |

EXAMPLE 24

The following example illustrates good quality alignment and pretilt in a novel hybrid polymer of the invention synthesized following Method 2, whereby the polyimide is functionalized by placing polymerizable allyl groups and vinyl groups on the diamines.

Synthesis of Hybrid Polymer 9

Similar to the procedure above for Hybrid Polymer 6, the Hybrid Polymer 9 was prepared from 227 mg wet Polyimide 6 (equivalent to 202 mg dry polyimide), 570 mg Addition Monomer 1 and 30 mg Addition Monomer 3 in 26 g of DMF containing 26 mg of AIBN. The solution was concentrated and precipitated twice into 60% toluene/methanol (v/v). The yield after vacuum drying was 343 mg, Mw 380,000. TN cells were prepared using alignment layers spin coated from 2 wt % solution in DMF except in this case the substrates were not cured. The characterization data is summarized in Table 16.

TABLE 16

| UV Energy (J/cm²) | Alignment quality | Pretilt (degrees) | VHR at 75° C. |
|---|---|---|---|
| 0.1 | O+ | −10.7 | 0.88 |
| 0.2 | O | −4.1 | 0.84 |

We claim:

1. A branched hybrid polymer that is prepared from
   (a) at least one component selected from the group consisting of polyimide, poly(amic acid) and esters thereof wherein the at least one component comprises at least one addition polymerization moiety, and
   (b) at least one component selected from the group consisting of a first addition monomer, one or more second addition monomers, different from the first addition monomer, and addition polymer wherein the at least one component comprises photoreactive group(s) capable of forming a covalent bond after exposure to light; and
   wherein the components (a) and (b) are covalently bonded to form a copolymer.

2. A branched hybrid polymer of claim 1 wherein component (a) has the at least one addition polymerization moiety located at at least one end of component (a).

3. A branched hybrid polymer of claim 2 wherein the at least one addition polymerization moiety of component (a) comprises at least one selected from the group consisting of methacrylates and its derivatives; acrylates and its derivatives; methacrylamides and its derivatives; acrylamides and its derivatives; allyl groups and its derivatives, vinyl groups and its derivatives, styrenes and its derivatives, maleimides or maleic anhydrides and its derivatives and norbornenes and its derivatives.

4. A branched hybrid polymer of claim 2 wherein the at least one addition polymerization moiety of component (a) comprises at least one styrene.

5. A branched hybrid polymer of claim 2 wherein at least one of component (a) is prepared from 4-vinyl aniline.

6. A branched hybrid polymer of claim 5 wherein component (b) comprises

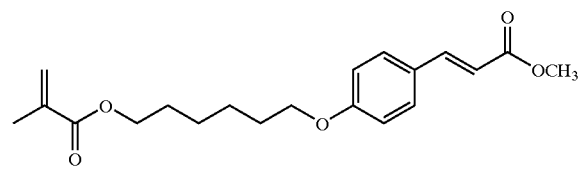

and

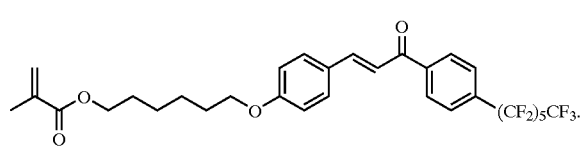

7. A branched hybrid polymer of claim 1 wherein component (a) comprises at least one addition polymerization moiety as a side chain.

8. A branched hybrid polymer of claim 7 wherein at least one addition polymerization moiety of component (a) comprises at least one selected from the group consisting of methacrylates and its derivatives; acrylates and its derivatives; methacrylamides and its derivatives; acrylamides and its derivatives; allyl groups and its derivatives, vinyl groups and its derivatives, styrenes and its derivatives, maleimides or maleic anhydrides and its derivatives and norbornenes and its derivatives.

9. A branched hybrid polymer of claim 7 wherein at least one of component (a) is prepared from at least one component selected from the group consisting of

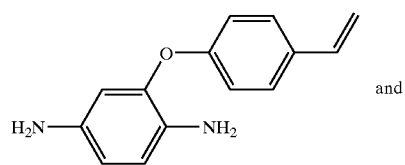

and

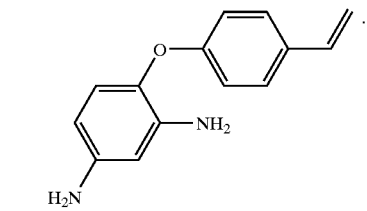

10. A branched hybrid polymer of claim 7 wherein the addition polymerization moieties comprise at least one allyl group.

11. A branched hybrid polymer of claim 7 wherein at least one of component (a) is prepared from at least one component selected from the group consisting of

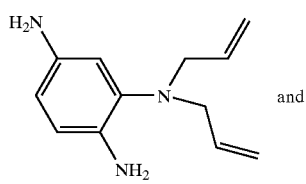 and

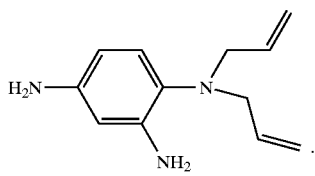

12. A branched hybrid polymer of claim 7 wherein at least one of component (a) is prepared from

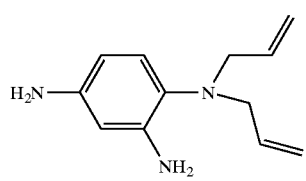

and at least one of component (b) comprises

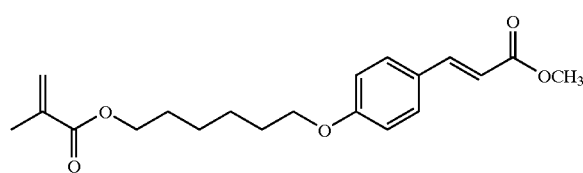

and

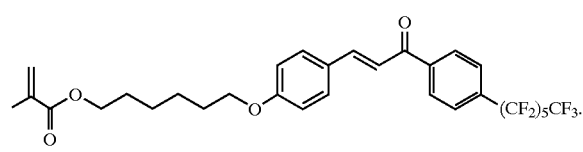

13. A branched hybrid polymer of claim 7 wherein at least one of component (a) is prepared from

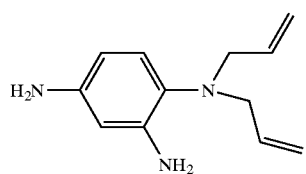

and at least one of component (b) comprises

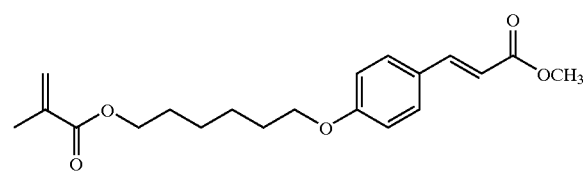

and

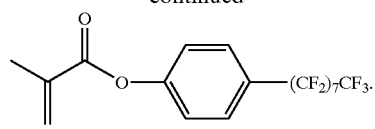

14. A branched hybrid polymer of claim 7 wherein at least one of component (a) is prepared from

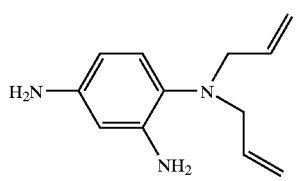

and at least one of component (b) comprises

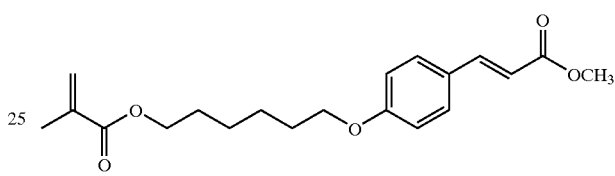

and

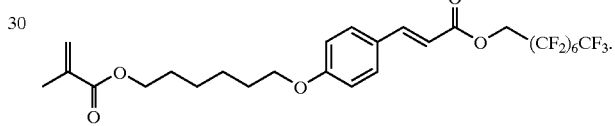

15. A branched hybrid polymer of claim 1 wherein at least one of component (b) comprises

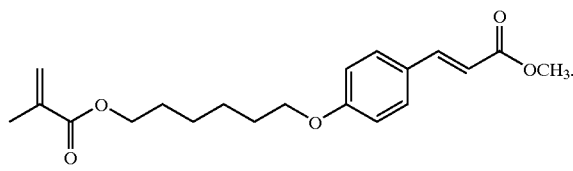

16. A branched hybrid polymer of claim 1 wherein at least one of component (b) comprises at least one selected from the group consisting of a C4–C24 alkyl chain, C4–C20 fluoroalkyl chain and partially fluorinated alkyl chain.

17. A branched hybrid polymer of claim 1 wherein at least one of component (b) comprises at least one component selected from the group consisting of

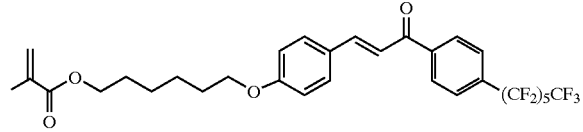

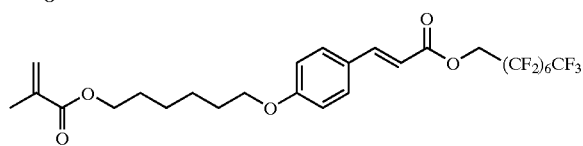

and

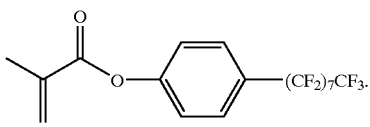

18. A branched hybrid polymer of claim 1 wherein at least one of component (b) is prepared from components containing at least one selected from the group consisting of methacrylates and derivatives; acrylates and derivatives; methacrylamides and derivatives; acrylamides and derivatives; allyl groups and derivatives, vinyl groups and derivatives, styrenes and derivatives, maleimides or maleic anhydride and derivatives and norbornenes and derivatives.

19. A branched hybrid polymer of claim 1 wherein at least one of component (b) is prepared from components containing at least one selected from the group consisting of cinnamates and derivatives, chalcones and derivatives, and coumarins and derivatives.

20. A branched hybrid polymer of claim 1 wherein the addition polymerization moiety comprises terminal methylene structure —$CH_2$=$CH_2$.

21. A branched hybrid polymer of claim 20 wherein the photoactive group(s) comprises 3-arylacrylic esters (cinnamates), chalcones or coumarin structures.

* * * * *